United States Patent
Kraus et al.

(10) Patent No.: US 11,106,789 B2
(45) Date of Patent: Aug. 31, 2021

(54) DYNAMIC CYBERSECURITY DETECTION OF SEQUENCE ANOMALIES

(71) Applicant: Microsoft Technology Licensing, LLC, Redmond, WA (US)

(72) Inventors: Naama Kraus, Haifa (IL); Roy Levin, Haifa (IL); Andrey Karpovsky, Kiryat Motzkin (IL); Tamer Salman, Haifa (IL)

(73) Assignee: Microsoft Technology Licensing, LLC, Redmond, WA (US)

( * ) Notice: Subject to any disclaimer, the term of this patent is extended or adjusted under 35 U.S.C. 154(b) by 350 days.

(21) Appl. No.: 16/292,520

(22) Filed: Mar. 5, 2019

(65) Prior Publication Data

US 2020/0285737 A1 Sep. 10, 2020

(51) Int. Cl.
*G06F 21/55* (2013.01)
*H04L 29/06* (2006.01)

(52) U.S. Cl.
CPC ...... *G06F 21/554* (2013.01); *G06F 2221/034* (2013.01)

(58) Field of Classification Search
None
See application file for complete search history.

(56) References Cited

U.S. PATENT DOCUMENTS

| | | |
|---|---|---|
| 2004/0128615 A1 | 7/2004 | Carmel et al. |
| 2006/0048106 A1 | 3/2006 | Citron et al. |
| 2007/0027873 A1 | 2/2007 | Factor et al. |
| 2007/0265999 A1 | 11/2007 | Amitay et al. |
| 2008/0141233 A1 | 6/2008 | Gurevich et al. |
| 2008/0313496 A1 | 12/2008 | Prabhakaran et al. |
| 2009/0055813 A1 | 2/2009 | Haber et al. |
| 2009/0319484 A1 | 12/2009 | Golbandi et al. |

(Continued)

FOREIGN PATENT DOCUMENTS

| | | | |
|---|---|---|---|
| WO | 2018037411 A1 | 3/2018 | |
| WO | WO-2018037411 A1 * | 3/2018 | ........... G06F 16/285 |

OTHER PUBLICATIONS

"International Search Report and Written Opinion Issued in PCT Application No. PCT/US2020/015335", dated Oct. 20, 2020, 15 Pages.

(Continued)

*Primary Examiner* — Joseph P Hirl
*Assistant Examiner* — Hassan Saadoun
(74) *Attorney, Agent, or Firm* — Ogilvie Law Firm

(57) ABSTRACT

Anomalous sequences are detected by approximating user sessions with heuristically extracted event sequences, allowing behavior analysis even without user identification or session identifiers. Extraction delimiters may include event count or event timing constraints. Event sequences extracted from logs or other event lists are vectorized and embedded in a vector space. A machine learning model similarity function measures anomalousness of a candidate sequence relative to a specified history, thus computing an anomaly score. Restrictions may be placed on the history to focus on a particular IP address or time frame, without retraining the model. Anomalous sequences may generate alerts, prompt investigations by security personnel, trigger automatic mitigation, trigger automatic acceptance, trigger tool configuration actions, or result in other cybersecurity actions.

20 Claims, 6 Drawing Sheets

(56) References Cited

U.S. PATENT DOCUMENTS

| | | |
|---|---|---|
| 2011/0131202 A1 | 6/2011 | Cohen et al. |
| 2011/0295783 A1* | 12/2011 | Zhao ..................... G06F 16/337 |
| | | 706/12 |
| 2013/0124576 A1 | 5/2013 | Adir et al. |
| 2013/0196305 A1 | 8/2013 | Adir et al. |
| 2014/0214396 A1 | 7/2014 | Adir et al. |
| 2014/0237450 A1 | 8/2014 | Levy et al. |
| 2015/0046138 A1 | 2/2015 | Adir et al. |
| 2015/0261649 A1 | 9/2015 | Boehm et al. |
| 2015/0263999 A1 | 9/2015 | Levin et al. |
| 2016/0063071 A1 | 3/2016 | Guy et al. |
| 2016/0188711 A1 | 6/2016 | Levin et al. |
| 2016/0217392 A1 | 7/2016 | Hashavit et al. |
| 2016/0246705 A1 | 8/2016 | Bitar et al. |
| 2016/0352765 A1* | 12/2016 | Mermoud ........... H04L 63/1458 |
| 2017/0063886 A1* | 3/2017 | Muddu ................ G06F 16/444 |
| 2017/0063906 A1* | 3/2017 | Muddu ................ G06F 16/444 |
| 2017/0068746 A1 | 3/2017 | Levin et al. |
| 2017/0103012 A1 | 4/2017 | Bitar et al. |
| 2017/0103099 A1 | 4/2017 | Bitar et al. |
| 2017/0109255 A1 | 4/2017 | Adir et al. |
| 2017/0109515 A1 | 4/2017 | Aharoni et al. |
| 2017/0124324 A1* | 5/2017 | Peleg ..................... G06N 3/006 |
| 2017/0193375 A1 | 7/2017 | Bitar et al. |
| 2017/0220945 A1 | 8/2017 | Barger et al. |
| 2017/0228418 A1 | 8/2017 | Levin et al. |
| 2017/0323463 A1 | 11/2017 | Leiba et al. |
| 2018/0069876 A1* | 3/2018 | Ben Ezra ........... H04L 63/1416 |
| 2018/0137303 A1 | 5/2018 | Farkash et al. |
| 2018/0152465 A1 | 5/2018 | Levin et al. |
| 2018/0158061 A1 | 6/2018 | Edelstein et al. |
| 2018/0189296 A1 | 7/2018 | Ashour et al. |
| 2018/0232518 A1 | 8/2018 | Copty et al. |
| 2018/0232520 A1 | 8/2018 | Frandzel et al. |
| 2018/0232523 A1 | 8/2018 | Copty et al. |
| 2018/0278633 A1 | 9/2018 | Brutzkus et al. |
| 2018/0316704 A1 | 11/2018 | Joseph Durairaj et al. |
| 2018/0349599 A1 | 12/2018 | Teller et al. |
| 2018/0367551 A1* | 12/2018 | Muddu ............... H04L 63/1416 |
| 2018/0367561 A1 | 12/2018 | Givental et al. |
| 2019/0068627 A1* | 2/2019 | Thampy .............. H04L 63/1416 |

OTHER PUBLICATIONS

Banerjee et al., "Anomaly Detection for Discrete Sequences: A Survey", retrieved from <<https://www.researchgate.net/publication/224198256_Anomaly_Detection_for_Discrete_Sequences_A_Survey>>, May 2012, 19 pages.

Duoc Le, et al., "Distributed Representations of Sentences and Documents", retrieved from <<https://cs.stanford.edu/~quocle/paragraph_vector.pdf>>, 2014, 9 pages.

"Welcome to PyOD documentation!", retrieved from <<https://pyod.readthedocs.io/en/latest/>>, no later than Feb. 16, 2019, 6 pages.

Cheryl Adams, "Top Cloud Data Security Risks, Threats, and Concerns", retrieved from <<https://blog.panoply.io/top-cloud-security-threats-risks-and-concerns>>, Sep. 27, 2017, 8 pages.

Brian Anderson, "Top 5 Cloud Data Security Threats in 2018", retrieved from <<https://blog.tierpoint.com/top-5-cloud-data-security-threats-in-2018>>, Jan. 25, 2018, 10 pages.

Fred Bals, "10 critical cloud security threats in 2018 and beyond", retrieved from <<https://www.synopsys.com/blogs/software-security/10-cloud-security-threats-2018/>>, Nov. 8, 2018, 13 pages.

David Freeman, Clarence Chio, "Machine Learning and Security", retrieved from <<https://www.oreilly.com/library/view/machine-learning-and/9781491979891/>>, Feb. 2018, 35 pages.

Chandola, et al., "Tech Report TR 08-021 A Comparative Evaluation of Anomaly Detection Techniques for Sequence Data", retrieved from <<https://www.cs.umn.edu/sites/cs.umn.edu/filesftech_reports/08-021.pdf>>, Jul. 7, 2008, 15 pages.

"Azure Storage Explorer", retrieved from <<https://azure.microsoft.com/en-us/features/storage-explorer/>>, no later than Feb. 17, 2019, 8 pages.

"models.doc2vec—Doc2vec paragraph embeddings", retrieved from <<https://radimrehurek.com/gensim/models/doc2vec.html>>, Jan. 31, 2019, 11 pages.

"Are there any more modern alternatives to word2vec?", retrieved from <<https://www.quora.com/Are-there-any-more-modern-alternatives-to-word2vec>>, Sep. 18, 2015, 3 pages.

* cited by examiner

DYNAMIC CYBERSECURITY DETECTION OF SEQUENCE ANOMALIES

BACKGROUND

Attacks on computing systems take many different forms, including some forms which are difficult to predict, and forms which may vary from one situation to another. Accordingly, one of the guiding principles of cybersecurity is "defense in depth". In practice, defense in depth is often pursed by forcing attackers to encounter multiple different kinds of security mechanisms at multiple different locations around or within a computing system. No single security mechanism is able to detect every kind of cyberattack, or able to end every detected cyberattack. But sometimes combining and layering a sufficient number and variety of defenses will deter an attacker, or at least limit the scope of harm from an attack.

To implement defense in depth, cybersecurity professionals consider the different kinds of attacks that could be made. They select defenses based on criteria such as: which attacks are most likely to occur, which attacks are most likely to succeed, which attacks are most harmful if successful, which defenses are in place, which defenses could be put in place, and the costs and procedural changes and training involved in putting a particular defense in place.

In particular, installing tools and techniques for detecting unusual behavior is one of the many possibilities to consider when implementing defense in depth. Tools and techniques have been developed for user behavior analytics (UBA) and for user and entity behavior analytics (UEBA), which may detect financial fraud, insider threats, targeted attacks from external sources, and other malicious behaviors in the context of routine and authorized behaviors. UBA and UEBA look at patterns of behavior by humans or by automated entities or both, and then apply algorithms (which may in turn apply statistical analysis) to detect significant departures from established patterns of behavior. Those departures, which may also be referred to as "anomalies", are then investigated as potential threats. Even when a given behavior is not malicious or harmful, designating it for individualized investigation can improve computing system functionality, by reducing the risk that actual threats will not be detected.

SUMMARY

Some teachings herein were motivated by technical challenges of implementing user behavior analysis to improve cybersecurity in cloud storage environments when some of the events being monitored are not expressly associated with any particular user. However, the teachings are not limited to that context. Other technical challenges addressed by the innovations taught here will also be apparent to one of skill from the discussion provided below.

Embodiments are presented which perform or provide a quality one may call "anomalous sequence detection". This quality may also be referred to as "sequence anomalies detection" or "detection of anomalous sequences" or "detection of sequences which document anomalies", and so on. Although on occasion a single recorded event may be an anomaly, context often illuminates. Embodiments here provide context for individual anomalous events, and also aid the detection of sequences in which no individual event is unusual or suspicious, yet the sequence as a whole (or a subsequence of multiple events) merits action to mitigate risk, to further assess risk, or in some cases to accept risk in an informed manner.

Some embodiments include or communicate with an event listing source which is configured to provide one or more lists of events. Each event represents an occurrence or a state, or both, in a guarded computing system (GCS). A sequence anomalies detection code obtains a list of events from the event listing source, and heuristically extracts an ordered event sequence from the list of events. The extracted sequence serves as a user session candidate, without relying on user identity data. A candidate vector is then produced by vectorizing the extracted ordered event sequence. The candidate vector is submitted to a machine learning model, which computes an anomaly score for the candidate vector. The machine learning model was trained using previously vectorized ordered event sequences which collectively represent a history of GCS events. The anomaly score may be interpreted as a representation of the risk that the sequence of events documents unauthorized activity. The anomaly score may be utilized to enhance cybersecurity of the GCS, e.g., by leading to actions which help mitigate risk or which knowingly accept risk.

Some embodiments use or perform operations that include acquiring a candidate event sequence to be tested for anomalousness, vectorizing it by embedding it in a vector space as a candidate vector, computing an anomaly score for the candidate vector, and utilizing the computed anomaly score. In these embodiments, the vectorizing is independent of any association of user account identification or user session identification with events of the candidate event sequence. The anomaly score for the candidate vector is computed using a machine learning model which was trained with previously vectorized event sequences which collectively represent a history of events in the GCS.

In some embodiments, the computed anomaly score of the candidate vector is utilized by performing one or more cybersecurity operations based at least in part on the computed anomaly score. Such operations may include, for example, configuring an intrusion detection tool or an intrusion prevention tool to prevent GCS intrusion, configuring an administrative interface to facilitate administration of the GCS, configuring a data loss prevention tool to prevent data loss from the GCS, configuring a security information and event management tool which monitors the GCS, configuring a cybersecurity tool which generates alerts about the GCS based at least in part on anomaly scores, or prompting an investigation of the GCS by a security analyst or other human security personnel or by an automated security investigator. Accordingly, these embodiments may help guard the GCS against cyberattacks, may help reduce the duration and impact of attacks, and may help reduce the risk of attacks going undetected.

Other technical activities pertinent to teachings herein will also become apparent to those of skill in the art. The examples given are merely illustrative. This Summary is not intended to identify key features or essential features of the claimed subject matter, nor is it intended to be used to limit the scope of the claimed subject matter. Rather, this Summary is provided to introduce—in a simplified form—some technical concepts that are further described below in the Detailed Description. The innovation is defined with claims, and to the extent this Summary conflicts with the claims, the claims should prevail.

DESCRIPTION OF THE DRAWINGS

A more particular description will be given with reference to the attached drawings. These drawings only illustrate selected aspects and thus do not fully determine coverage or scope.

DETAILED DESCRIPTION

Overview

Figure 1:
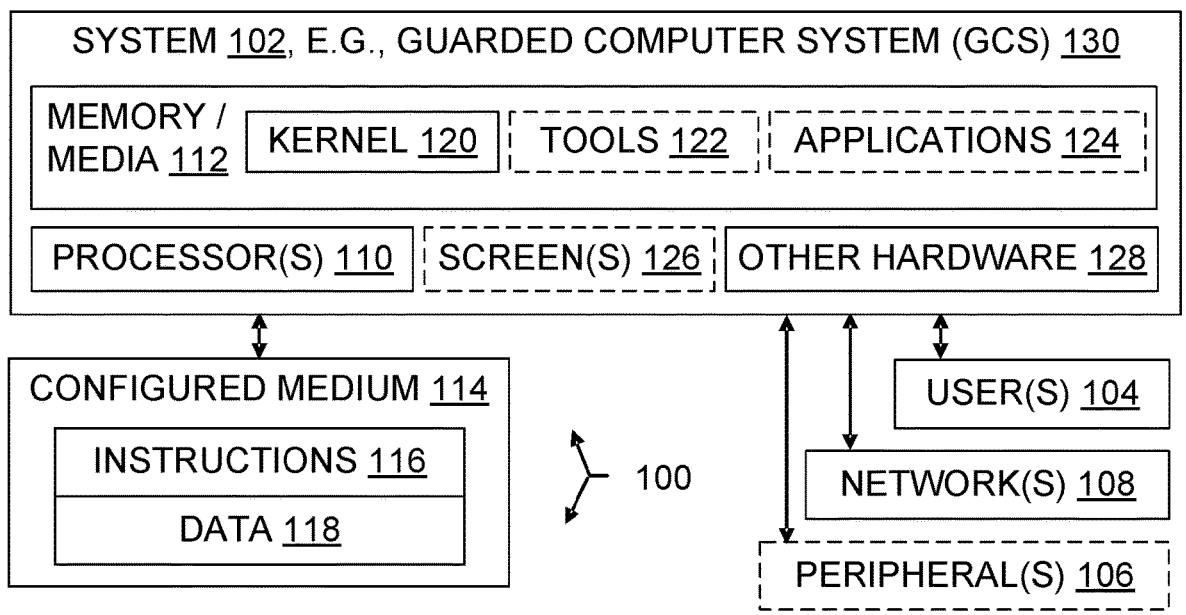
FIG. 1 is a block diagram illustrating computer systems generally and also illustrating configured storage media generally.

Many innovations expand beyond their origins, but understanding an innovation's origins can help one more fully appreciate the innovation. In the present case, some teachings presented herein were motivated by a technical challenge of increasing the security of Microsoft Azure® cloud storage against attacks (mark of Microsoft Corporation). An associated challenge was how to define user sessions in a way that permits useful behavior analytics when storage requests do not have explicit respective user session IDs or user account IDs. Lack of such IDs poses a challenge, because behavior analytics like UBA and UEBA rely on differentiating between users, by presuming that users who are alike will behave similarly unless something happens that increases cyber risk.

Intuitively, one may assume that a malicious attack is characterized by abnormal activity. With suitable insight, this assumption may lead to a specific goal of identifying anomalous sequences in logged events, or event streams, or in other event lists. One can then try to devise ways to model normal behavior, and ways to check whether a session of interest deviates from that model. Detected deviations can then trigger cybersecurity actions to mitigate risk, or to accept risk in an informed manner, for example.

In some situations, a cyberattack may not be evident at all in an event log, and in some, it may be evident in only a single log entry. But in other cases, malicious attacks of computer systems perform an abnormal sequence of events, and that abnormal sequence is evident in recorded events. Identifying anomalous sequences of events can therefore be a useful capability in cybersecurity defense systems, since anomalous sequences may be likely to at least hint at potential attacks or help reveal previously undetected attacks. A sequence anomaly detection algorithm as taught herein can be used as part of a larger algorithm for detecting attacks, or as a utility assisting security officers to investigate security alerts, by helping security tools and analysts pinpoint anomalous sessions.

A possible approach to computing sequence anomaly is to build a profile of a user's normal event sequences based on the user's history. Given a new input sequence (e.g., one previously unseen, or one considered in a new context), a sequence anomaly algorithm predicts the likelihood that the input sequence is abnormal, given the user's history profile.

In order to implement sequence anomaly detection, a system might be expected to maintain user information and associate it with each event. A problem, however, is that in many contexts user information is unavailable. For example, a storage service accepts requests from many applications which don't necessarily provide the user information associated with each request. The lack of user identity info may be due to privacy protections, for example, or due to technical reasons such as request formats or compatibility with legacy code. In such a setting, it is challenging to compute a user-specific model, due to the lack of user identity information.

Some teachings presented herein use or provide a dynamic and fine-grained algorithm which predicts sequence anomalousness for enhanced cybersecurity without having fully accurate user identification info associated with each event of interest. One such algorithm constructs event sequences which approximate user sequences based on a given event log. It then constructs a history model that includes a set of high quality representations of these sequences. At runtime, the algorithm predicts sequence anomalies based on the learned model. That is, the algorithm provides anomaly prediction of an input sequence compared to the set of all modelled sequences which represent the whole of the known history.

In addition, this algorithm predicts sequence anomaly compared to a dynamically defined subset of the modelled sequences. This fine-grained capability provides a fine-grained anomaly prediction, which is highly useful for investigation purposes. For example, one may explore a sequence's anomalousness relative to sequences that used some given IP address, or that occurred in a specified time interval. Defining different history subsets dynamically while using only a single trained model of the history relieves the detection system from pre-training and constructing multiple models upfront, which in turn helps make approaches taught here highly scalable, and also saves model computation and storage costs.

Some of the security enhancement approaches with sequence anomaly detection as taught herein explicitly address a lack of user identity and session identity information in events being analyzed. Some support anomaly prediction through comparison of event sequences to a dynamically specified subset of the modelled history. This may be done in a scalable way, as it does not pre-train all models in advance. Some embed sequences in a vector space to implement sequence anomaly detection.

Some embodiments herein enhance (i.e., support or provide) behavior analytics. In pursuing better cybersecurity, knowing which user activity sequences are anomalous may help behavior analytics determine whether particular resource access activity or other activity is suspicious. Alerts can be generated for suspicious activity, and false positives can be filtered out or reduced by avoiding alerts based on benign activity. A threshold for a sufficient level of similarity between activity sequences may be administrator-specified, or it may be a result of automatic tuning of a system, for example.

Some embodiments described herein may be viewed by some people in a broader context. For instance, concepts such as alerts, events, history, identity, sequences, and similarity may be deemed relevant to a particular embodiment. However, it does not follow from the availability of a broad context that exclusive rights are being sought herein for abstract ideas; they are not.

Rather, the present disclosure is focused on providing appropriately specific embodiments whose technical effects fully or partially solve particular technical problems, such as how to score the similarity of two user accounts based on filesystem and other access permissions granted to those accounts. Other configured storage media, systems, and processes involving alerts, events, history, identity, sequences, or similarity are outside the present scope. Accordingly, vagueness, mere abstractness, lack of technical character, and accompanying proof problems are also avoided under a proper understanding of the present disclosure.

More generally, one of skill will recognize that not every part of this disclosure, or any particular details therein, are necessarily required to satisfy legal criteria such as enablement, written description, or best mode. Also, embodiments are not limited to the particular account environments, tools, contexts, identifiers, fields, properties, files, data structures, notations, control flows, pseudocode, or other implementation choices described herein. Any apparent conflict with any other patent disclosure, even from the owner of the present innovations, has no role in interpreting the claims presented in this patent disclosure.

Technical Character

The technical character of embodiments described herein will be apparent to one of ordinary skill in the art, and will also be apparent in several ways to a wide range of attentive readers. Some embodiments address technical activities such as detecting departures from the normal user behavior evident in computing system logs, e.g., by extracting ordered event sequences, vectorizing them, embedding them in a vector space of a trained machine learning model, and computing vector-based anomaly scores, as well as cybersecurity activities to control access to computing system resources, which are activities deeply rooted in computing technology. Thus, purely mental processes are excluded. Some embodiments improve the functioning of computing systems by enhancing cybersecurity through the automatic detection of apparent, likely, or actual attacks, based on behavior analytics. Some detect an attack in sufficient time to disrupt the attack, mitigate harm from the attack, identify a source of the attack, or identify a resource as compromised promptly after it is breached by the attack. Other advantages based on the technical characteristics of the teachings will also be apparent to one of skill from the description provided.

Acronyms, Abbreviations, Names, and Symbols

Some acronyms, abbreviations, names, and symbols are defined below. Others are defined elsewhere herein, or do not require definition here in order to be understood by one of skill.

ALU: arithmetic and logic unit
API: application program interface
ATP: Azure® Advanced Threat Protection (mark of Microsoft Corp.)
BIOS: basic input/output system
CD: compact disc
CPU: central processing unit
DVD: digital versatile disk or digital video disc
FPGA: field-programmable gate array
FPU: floating point processing unit
GCS: guarded computing system
GPU: graphical processing unit
GUI: graphical user interface
IaaS or IAAS: infrastructure-as-a-service
ID: identification or identity
IDS: intrusion detection system, may be or include an HIDS (host-based IDS) or an NIDS (network-based IDS), for example
IoT: Internet of things
IP: Internet protocol
LAN: local area network
OS: operating system
PaaS or PAAS: platform-as-a-service
RAM: random access memory
ROM: read only memory
SIEM: security information and event management; security information and event management tool
UBA: user behavior analytics
UEBA: user and entity behavior analytics
UEFI: Unified Extensible Firmware Interface
VM: virtual machine
WAN: wide area network Some Additional Terminology Reference is made herein to exemplary embodiments such as those illustrated in the drawings, and specific language is used herein to describe the same. But alterations and further modifications of the features illustrated herein, and additional technical applications of the abstract principles illustrated by particular embodiments herein, which would occur to one skilled in the relevant art(s) and having possession of this disclosure, should be considered within the scope of the claims.

The meaning of terms is clarified in this disclosure, so the claims should be read with careful attention to these clarifications. Specific examples are given, but those of skill in the relevant art(s) will understand that other examples may also fall within the meaning of the terms used, and within the scope of one or more claims. Terms do not necessarily have the same meaning here that they have in general usage (particularly in non-technical usage), or in the usage of a particular industry, or in a particular dictionary or set of dictionaries. Reference numerals may be used with various phrasings, to help show the breadth of a term. Omission of a reference numeral from a given piece of text does not necessarily mean that the content of a Figure is not being discussed by the text. The inventors assert and exercise the right to specific and chosen lexicography. Quoted terms are being defined explicitly, but a term may also be defined implicitly without using quotation marks. Terms may be defined, either explicitly or implicitly, here in the Detailed Description and/or elsewhere in the application file.

As used herein, a "computer system" (a.k.a. "computing system") may include, for example, one or more servers, motherboards, processing nodes, laptops, tablets, personal computers (portable or not), personal digital assistants, smartphones, smartwatches, smartbands, cell or mobile phones, other mobile devices having at least a processor and a memory, video game systems, augmented reality systems, holographic projection systems, televisions, wearable computing systems, and/or other device(s) providing one or more processors controlled at least in part by instructions. The instructions may be in the form of firmware or other software in memory and/or specialized circuitry.

A "multithreaded" computer system is a computer system which supports multiple execution threads. The term "thread" should be understood to include any code capable of or subject to scheduling (and possibly to synchronization), and may also be known by another name, such as "task," "process," or "coroutine," for example. The threads may run in parallel, in sequence, or in a combination of parallel execution (e.g., multiprocessing) and sequential execution (e.g., time-sliced).

A "processor" is a thread-processing unit, such as a core in a simultaneous multithreading implementation. A processor includes hardware. A given chip may hold one or more processors. Processors may be general purpose, or they may be tailored for specific uses such as vector processing, graphics processing, signal processing, floating-point arithmetic processing, encryption, I/O processing, machine learning, and so on.

"Kernels" include operating systems, hypervisors, virtual machines, BIOS or UEFI code, and similar hardware interface software.

"Code" means processor instructions, data (which includes constants, variables, and data structures), or both instructions and data. "Code" and "software" are used interchangeably herein. Executable code, interpreted code, and firmware are some examples of code.

"Program" is used broadly herein, to include applications, kernels, drivers, interrupt handlers, firmware, state machines, libraries, and other code written by programmers (who are also referred to as developers) and/or automatically generated.

"Service" means a consumable program offering in a cloud computing environment or other network or computing system environment.

"Cloud" means pooled resources for computing, storage, and networking which are elastically available for measured on-demand service. A cloud may be private, public, community, or a hybrid, and cloud services may be offered in the form of infrastructure as a service, platform as a service, software as a service, or another service. Unless stated otherwise, any discussion of reading from a file or writing to a file includes reading/writing a local file or reading/writing over a network, which may be a cloud network or other network, or doing both (local and networked read/write).

"IoT" or "Internet of Things" means any networked collection of addressable embedded computing nodes. Such nodes are examples of computer systems as defined herein, but they also have at least two of the following characteristics: (a) no local human-readable display; (b) no local keyboard; (c) the primary source of input is sensors that track sources of non-linguistic data; (d) no local rotational disk storage—RAM chips or ROM chips provide the only local memory; (e) no CD or DVD drive; (f) embedment in a household appliance or household fixture; (g) embedment in an implanted or wearable medical device; (h) embedment in a vehicle; (i) embedment in a process automation control system; or (j) a design focused on one of the following: environmental monitoring, civic infrastructure monitoring, industrial equipment monitoring, energy usage monitoring, human or animal health monitoring, physical security, or physical transportation system monitoring. IoT storage may be a target of unauthorized access, either via a cloud, via another network, or via direct local access attempts.

As used herein, "include" allows additional elements (i.e., includes means comprises) unless otherwise stated.

"Optimize" means to improve, not necessarily to perfect. For example, it may be possible to make further improvements in a program or an algorithm which has been optimized.

"Process" is sometimes used herein as a term of the computing science arts, and in that technical sense encompasses resource users, namely, coroutines, threads, tasks, interrupt handlers, application processes, kernel processes, procedures, and object methods, for example. "Process" is also used herein as a patent law term of art, e.g., in describing a process claim as opposed to a system claim or an article of manufacture (configured storage medium) claim. Similarly, "method" is used herein at times as a technical term in the computing science arts (a kind of "routine") and also as a patent law term of art (a "process"). "Process" and "method" in the patent law sense are used interchangeably herein. Those of skill will understand which meaning is intended in a particular instance, and will also understand that a given claimed process or method (in the patent law sense) may sometimes be implemented using one or more processes or methods (in the computing science sense).

"Automatically" means by use of automation (e.g., general purpose computing hardware configured by software for specific operations and technical effects discussed herein), as opposed to without automation. In particular, steps performed "automatically" are not performed by hand on paper or in a person's mind, although they may be initiated by a human person or guided interactively by a human person. Automatic steps are performed with a machine in order to obtain one or more technical effects that would not be realized without the technical interactions thus provided.

One of skill understands that technical effects are the presumptive purpose of a technical embodiment. The mere fact that calculation is involved in an embodiment, for example, and that some calculations can also be performed without technical components (e.g., by paper and pencil, or even as mental steps) does not remove the presence of the technical effects or alter the concrete and technical nature of the embodiment. Operations such as automatically obtaining event lists through an API, automatically extracting event sequences, vectorizing event sequences, training and using a machine learning model, computing similarity scores, filtering out portions of a history based on IP address or time or other values, and performing behavior analytics in a production environment, are understood herein as inherently digital. A human mind cannot interface directly with a CPU or other processor, or with RAM or other digital storage, to read and write the necessary data to perform the cybersecurity steps taught herein. This would all be well understood by persons of skill in the art in view of the present disclosure, but others may sometimes need to be informed or reminded of the facts.

Unless stated otherwise, embodiments are presumed to be capable of operating at production scale in commercial production environments when properly configured and supplied with data, or in testing labs for production environments, as opposed to being mere thought experiments. "Production scale" means capable of extracting at least one sequence from an event list containing at least one hundred events, or capable of using a machine learning model trained with at least five hundred vectorized sequences, or capable of utilizing a computed anomaly score of a candidate vector to trigger or control or otherwise "configure" a commercially available cybersecurity tool or an open-sourced cybersecurity tool which has a support community of at least one hundred developers, or any combination of the foregoing capabilities.

"Computationally" likewise means a computing device (processor plus memory, at least) is being used, and excludes obtaining a result by mere human thought or mere human action alone. For example, doing arithmetic with a paper and pencil is not doing arithmetic computationally as understood herein. Computational results are faster, broader, deeper, more accurate, more consistent, more comprehensive, and/or otherwise provide technical effects that are beyond the scope of human performance alone. "Computational steps" are steps performed computationally. Neither "automatically" nor "computationally" necessarily means "immediately". "Computationally" and "automatically" are used interchangeably herein.

"Proactively" means without a direct request from a user. Indeed, a user may not even realize that a proactive step by an embodiment was possible until a result of the step has been presented to the user. Except as otherwise stated, any computational and/or automatic step described herein may also be done proactively.

Throughout this document, use of the optional plural "(s)", "(es)", or "(ies)" means that one or more of the indicated features is present. For example, "processor(s)" means "one or more processors" or equivalently "at least one processor".

For the purposes of United States law and practice, use of the word "step" herein, in the claims or elsewhere, is not intended to invoke means-plus-function, step-plus-function, or 35 United State Code Section 112 Sixth Paragraph/Section 112(f) claim interpretation. Any presumption to that effect is hereby explicitly rebutted.

For the purposes of United States law and practice, the claims are not intended to invoke means-plus-function interpretation unless they use the phrase "means for". Claim language intended to be interpreted as means-plus-function language, if any, will expressly recite that intention by using the phrase "means for". When means-plus-function interpretation applies, whether by use of "means for" and/or by a court's legal construction of claim language, the means recited in the specification for a given noun or a given verb should be understood to be linked to the claim language and linked together herein by virtue of any of the following: appearance within the same block in a block diagram of the figures, denotation by the same or a similar name, denotation by the same reference numeral, a functional relationship depicted in any of the figures, a functional relationship noted in the present disclosure's text. For example, if a claim limitation recited a "zac widget" and that claim limitation became subject to means-plus-function interpretation, then at a minimum all structures identified anywhere in the specification in any figure block, paragraph, or example mentioning "zac widget", or tied together by any reference numeral assigned to a zac widget, or disclosed as having a functional relationship with the structure or operation of a zac widget, would be deemed part of the structures identified in the application for zac widgets and would help define the set of equivalents for zac widget structures.

Throughout this document, unless expressly stated otherwise any reference to a step in a process presumes that the step may be performed directly by a party of interest and/or performed indirectly by the party through intervening mechanisms and/or intervening entities, and still lie within the scope of the step. That is, direct performance of the step by the party of interest is not required unless direct performance is an expressly stated requirement. For example, a step involving action by a party of interest such as acquiring, alerting, associating, calculating, comparing, computing, configuring, delimiting, detecting, determining, distinguishing, enhancing, excluding, executing, extracting, filtering, finding, generating, identifying, implementing, learning, listing, obtaining, performing, producing, prompting, providing, reading, receiving, restricting, scoring, selecting, submitting, testing, training, transforming, triggering, tuning, using, utilizing, vectorizing, writing (and acquires, acquired, alerts, alerted, etc.) with regard to a destination or other subject may involve intervening action such as forwarding, copying, uploading, downloading, encoding, decoding, compressing, decompressing, encrypting, decrypting, authenticating, invoking, and so on by some other party, including any action recited in this document, yet still be understood as being performed directly by the party of interest.

Whenever reference is made to data or instructions, it is understood that these items configure a computer-readable memory and/or computer-readable storage medium, thereby transforming it to a particular article, as opposed to simply existing on paper, in a person's mind, or as a mere signal being propagated on a wire, for example. For the purposes of patent protection in the United States, a memory or other computer-readable storage medium is not a propagating signal or a carrier wave or mere energy outside the scope of patentable subject matter under United States Patent and Trademark Office (USPTO) interpretation of the In re Nuijten case. No claim covers a signal per se or mere energy in the United States, and any claim interpretation that asserts otherwise in view of the present disclosure is unreasonable on its face. Unless expressly stated otherwise in a claim granted outside the United States, a claim does not cover a signal per se or mere energy.

Moreover, notwithstanding anything apparently to the contrary elsewhere herein, a clear distinction is to be understood between (a) computer readable storage media and computer readable memory, on the one hand, and (b) transmission media, also referred to as signal media, on the other hand. A transmission medium is a propagating signal or a carrier wave computer readable medium. By contrast, computer readable storage media and computer readable memory are not propagating signal or carrier wave computer readable media. Unless expressly stated otherwise in the claim, "computer readable medium" means a computer readable storage medium, not a propagating signal per se and not mere energy.

An "embodiment" herein is an example. The term "embodiment" is not interchangeable with "the invention". Embodiments may freely share or borrow aspects to create other embodiments (provided the result is operable), even if a resulting combination of aspects is not explicitly described per se herein. Requiring each and every permitted combination to be explicitly and individually described is unnecessary for one of skill in the art, and would be contrary to policies which recognize that patent specifications are written for readers who are skilled in the art. Formal combinatorial calculations and informal common intuition regarding the number of possible combinations arising from even a small number of combinable features will also indicate that a large number of aspect combinations exist for the aspects described herein. Accordingly, requiring an explicit recitation of each and every combination would be contrary to policies calling for patent specifications to be concise and for readers to be knowledgeable in the technical fields concerned.

LIST OF REFERENCE NUMERALS

The following list is provided for convenience and in support of the drawing figures and as part of the text of the specification, which describe innovations by reference to multiple items. Items not listed here may nonetheless be part of a given embodiment. For better legibility of the text, a given reference number is recited near some, but not all, recitations of the referenced item in the text. The same reference number may be used with reference to different examples or different instances of a given item. The list of reference numerals is:

100 operating environment, also referred to as computing environment 102 computer system, also referred to as computational system or computing system 104 users 106 peripherals 108 network generally, including, e.g., LANs, WANs, software defined networks, clouds, and other wired or wireless networks 110 processor 112 computer-readable storage medium, e.g., RAM, hard disks 114 removable configured computer-readable storage medium 116 instructions executable with processor; may be on removable storage media or in other memory (volatile or non-volatile or both)

118 data 120 kernel(s), e.g., operating system(s), BIOS, UEFI, device drivers 122 tools, e.g., anti-virus software, firewalls, packet sniffer software, intrusion detection systems (IDS), intrusion prevention systems (IPS), debuggers, profilers, compilers, interpreters, static code analysis tools, software development tools and tool suites, hardware development tools and tool suites, diagnostics 124 applications, e.g., word processors, web browsers, spreadsheets, games, email tools 126 display screens, also referred to as "displays"

128 computing hardware not otherwise associated with a reference number 106, 108, 110, 112, 114

130 guarded computing system 200 actor, i.e., an entity or group of entities that performs one or more actions in or to a computing system; an actor may be an individual user, e.g., user with username Foo-BarBob, or a collection of users, e.g., everyone sending packets from a specified range of network addresses or a through a specified proxy or from a specified IP address 202 actor identifier, a.k.a. "actor ID" or "actor-id"; may be implemented as a string, a hash value, a pointer, an index into a table of identifiers, a handle, a globally unique identifier (GUID), or another value that identifies an actor or an actor's account to a kernel or to cybersecurity software or both 204 event in a computing system, e.g., an attempt to access a resource; unless clearly indicated otherwise by context or definition, includes both failed attempts and successful attempts; may be, e.g., in the form of a packet, a procedure call, a method invocation, an interrupt, a signal, or another form; may be documented in an event list 216

206 resource in a computing system 208 resource identifier, a.k.a. "resource ID" or "resource-id"; may be implemented as a string, a hash value, a pointer, an index into a table of identifiers, a handle, a globally unique identifier (GUID), or another value that identifies a resource to a kernel or to cybersecurity software or both 210 storage item; may be a cloud-based storage item such as storage accessed through a cloud API, or a non-cloud-based storage item such as a storage item local to a machine or accessed only through a local area network 212 event generator, e.g., a software agent, hardware circuit, program, tool, utility, interrupt handler, exception handler, sniffer, or any other piece of computing technology which generates one or more events as electronic signals or digital data or both 214 event list source; understood here to be computing technology, not people; may be, e.g., an event generator, or a storage location holding generated events 216 list of two or more events 204

302 event log, e.g., file which contains data structures documenting events 304 sniffer tools, e.g., taps, proxies, protocol analyzers, network analyzers, packet analyzers 306 security information and event management (SIEM) tools 400 system configured with anomalous sequence detection functionality for cybersecurity 402 machine learning model; assumed to be trained unless stated otherwise (which occurs, e.g., in FIG. 10's recital of a "model being trained"); may be or include a neural network or another machine learning model, with aspects adapted from NLT (natural language technology)

404 sequence of events generally; may be partially ordered or fully ordered, chronologically 406 anomaly, e.g., a sequence whose anomaly score exceeds a specified threshold 408 sequence anomaly detection code; this is explicitly executable software supported by computing hardware, or another machine such as an ASIC, as opposed to a human 410 extracted sequence of events used to approximate a session, e.g., an extracted and ordered (partially or fully) sequence of events; also referred to as a "candidate" sequence; a candidate for a user session may differ from an actual user session, e.g., by including only a proper subset of the events recorded during the actual user session, by including events from a different actual user session, or both 412 a candidate vector, which may be referred to as a "candidate" in contrast to vectors which have previously been used to train the model 402, and to emphasize that action may be taken based on whether this candidate is actually an anomaly; corresponds to a candidate sequence 410

414 anomaly score for a candidate event sequence or a vector corresponding to the candidate event sequence 416 history, i.e., a collection of events against which anomalousness can be scored 418 history restrictor, e.g., Boolean condition specifying a set of one or more IP addresses of interest, a time period of interest, or other criteria for restricting an anomalousness context to a proper subset of a full available history 420 coarse detector, e.g., an intrusion detection system whose false positive rate or count is greater than the false positive rate of the sequence anomaly detector and therefore benefits to accuracy or efficiency or both may be achieved by using the sequence anomaly detector to exclude as false some of the event sequences flagged as positive by the coarse detector 422 interfaces (APIs, URLs, shared logs, and so on) to a system 400

424 cloud, e.g., private cloud, public cloud, hybrid cloud, community cloud; a storage environment which provides scalability, elasticity, resource pooling, and a measured storage service 426 service 428 cloud infrastructure, e.g., APIs for allocating, deploying, or accessing cloud storage or other cloud resources such as computing or network resources; may include hypervisors or other kernels 430 virtual machine 432 metric in vector space; may be implemented using calculations 700; may also be referred to a "similarity function"; a similarity score produced by the metric may also be designated by reference numeral 432

434 code which upon execution enforces history restriction condition(s)

500 aspects of sequence anomaly detection code 502 heuristic extraction of sequences; also refers to heuristics that guide heuristic extraction 504 code which upon execution performs heuristic extraction of sequences 506 user session 510 non-reliance on user identity information, e.g., code may have a non-reliance characteristic 510 if the code approximates a user session even when user identity information is unavailable, or if the code approximates a user session without using available user identity information to determine what gets included or excluded from an event sequence that approximates the user session 512 user identity data, e.g., actor-ids or session IDs 514 maximum number of events which is allowed by code in an extracted sequence that approximates a user session 516 maximum time between chronologically ordered events which is allowed by code in an extracted sequence that approximates a user session; may refer to chronological gap between any two consecutive events of a sequence, or to the chronological gap between earliest and latest event in sequence; may be measured in wall clock time, system time, processor cycles, system ticks, or another unit that measures passage of time 518 machine learning model hyperparameter, i.e., parameter whose values often impact the efficiency, correctness, speed, or other performance characteristic(s) of the machine learning model, and which can be imposed independently of the model's content and status as opposed to learned parameters which can be derived automatically from datasets used in training/testing/tuning the model 520 anchor event of an extracted sequence of events, namely, event from which a hyperparameter 518 (e.g., number of events 514 or maximum time span from first event to last event) is calculated 522 code which upon execution selects an anchor event of a sequence during extraction of the sequence from an event list 524 condition used in model 402 or sequence anomaly detection code 408

526 user session ID 600 items related to privacy 604 privacy policy 606 user account 700 calculations or code which may be used when computing sequence anomaly scores 414

702 K nearest neighbors calculation, or code which upon execution performs this calculation 704 isolation forest calculation, or code which upon execution performs this calculation 706 local outlier factor calculation, or code which upon execution performs this calculation 800 vectorization, or code which upon execution performs vectorization, or act of vectorizing 802 transformation of an event sequence into a piece of text, e.g., by concatenation, or code which upon execution performs this transformation, or act of transforming 804 a piece of text, e.g., a string of alphanumeric characters 806 feature representations, e.g., a vector having one or more features 808 length, e.g., length of a piece of text or length of an event sequence or length of a vector 810 vector space 812 token which represents a feature value 814 vector generally 900 cybersecurity actions (also referred to as "operations"), i.e., actions which monitor security in a computing system, assess risk therein, accept risk therein, mitigate risk therein, communicate about risk therein, or otherwise use a risk measure such as an anomaly score to promote cybersecurity 902 utilize an anomaly score to promote cybersecurity 904 configure a tool, e.g., trigger execution of the tool, or control accuracy or sensitivity or responsiveness of the tool, or feed the tool a parameter or event data 906 prompt further investigation of an event or an event sequence, e.g., by prompting execution of investigation software or by prompting investigation by a human security analyst 908 action which mitigates risk in a computing system, e.g., resetting credentials of compromised accounts whose credentials were changed by an attacker and thus restoring access to the authorized user, or restoring data that was altered or deleted after an account was breached, or taking other actions taught herein 910 prevention of one or more operations in a computing system, e.g., denying access, stalling, killing a connection 912 termination of one or more operations in a computing system 914 generating or sending an alert about a state or event detected in a computing system, thereby alerting a human or a software process or both, e.g., by text, email, visible alert, signal, or other alert transmission 916 flagging a data structure, storage item, or other artifact in a computing system to denote a risk or indicate further investigation is prudent 918 action which accepts risk in a computing system, e.g., by moving on to process a different detected state or detected event instead of pursuing additional processing of the action(s) associated with the accepted risk 920 marking a data structure, storage item, or other artifact in a computing system to denote an accepted risk or indicate further investigation is not deemed prudent 922 making a log entry 924 executing code that allows an operation in a computing system or selecting an execution path which does so, when code is also present that would attempt to prevent or terminate the operation if it had been executed instead of the code that allows the operation 926 access to a resource in a computing system 1000 data flow diagram; dataflow in an example architecture that includes both creating a trained model and utilizing the trained model for risk management 1002 vectors or underlying event sequences used to train a machine learning model 1004 vectors or underlying event sequences used in testing a machine learning model 1006 vectors or underlying event sequences used in tuning a machine learning model; a dataset generally may be partitioned or otherwise divided (e.g., for cross-validation) into a training dataset 1002, a testing dataset 1004, and a tuning dataset 1006

1008 training a machine learning model 1010 testing a machine learning model; may also be referred to as "validating" the model 1012 tuning a machine learning model, that is, performing operations to improve one or more performance characteristics of the model, such as memory usage efficiency, execution speed, fitting accuracy, perceived clarity of relationships between candidate event sequence and anomaly score, and so on 1014 model creation phase 1016 model utilization phase 1018 risk, e.g., a likelihood that a threat actor will exploit a vulnerability to gain unauthorized access to a resource of a computing system 1020 one or more threshold values used in risk management code 1022 storage requests, e.g., requests to read or write from cloud storage; a request is an example of an event 204

Figure 11:
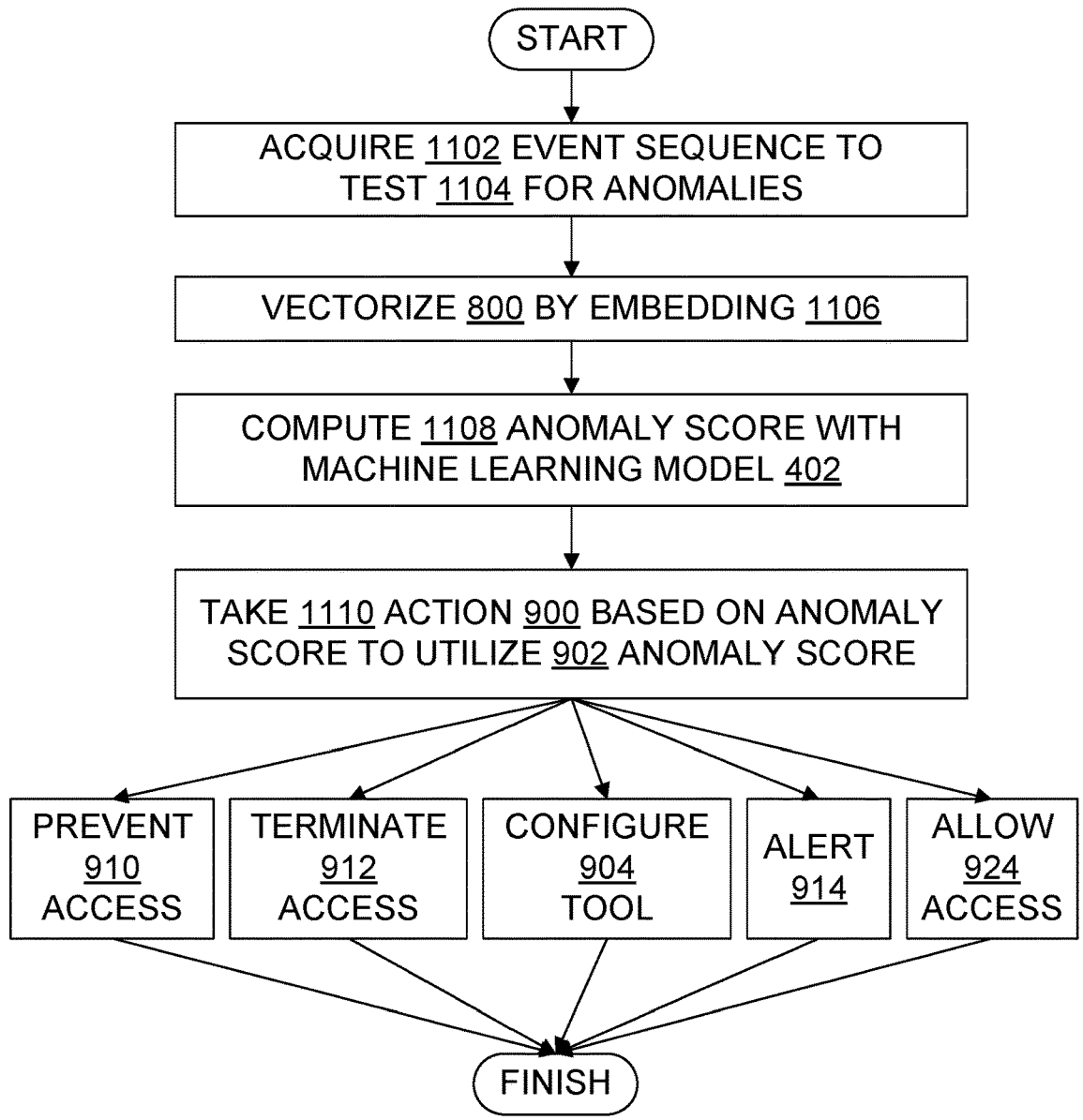
FIG. 11 is a flowchart illustrating some example cybersecurity methods.

1024 security personnel such as network administrators, system administrators, security analysts, information security officers, and so on 1100 flowchart; 1100 also refers to cybersecurity methods illustrated by or consistent with the FIG. 11 flowchart 1102 acquire an event sequence, e.g., by extracting the sequence from an event list 1104 test an event sequence for anomalousness relative to a history 1106 embed data in a vector space; algorithms used to perform embedding may also be designated by reference numeral 1106

Figure 10:
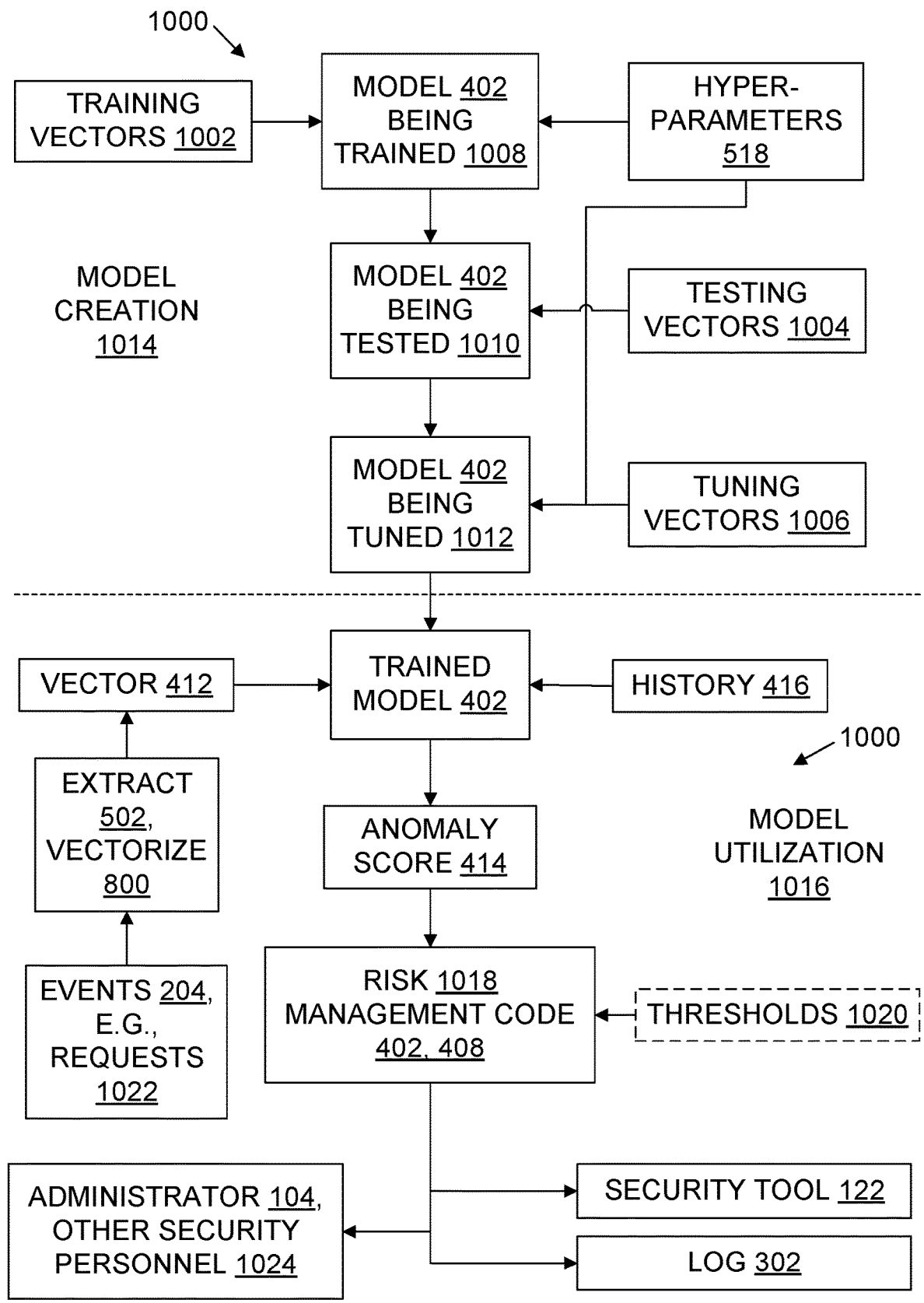
FIG. 10 is a data flow diagram illustrating some aspects of machine learning model training, testing, tuning, and usage for cybersecurity.
Figure 12:
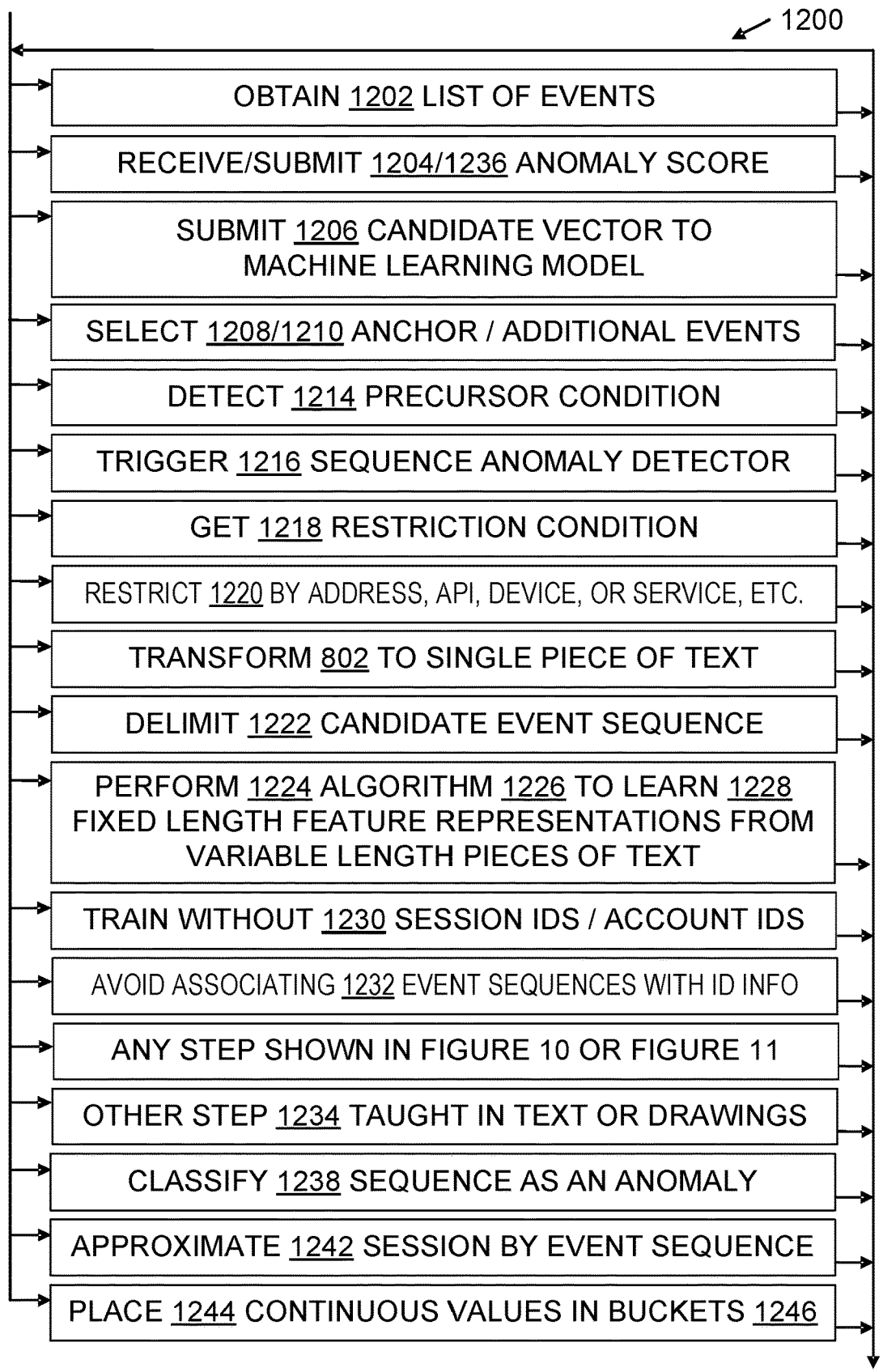
FIG. 12 is a flowchart further illustrating steps in some cybersecurity methods.

1108 compute an anomaly score 1110 taking an action based on a recommendation score or based on a risk score that is based on the recommendation score 1200 flowchart; 1200 also refers to cybersecurity methods illustrated by or consistent with the FIG. 12 flowchart (which incorporates the steps of FIG. 11 and FIG. 10)

1202 obtain a list of events, e.g., by opening a log or connecting to an event list source and receiving such a list 1204 receive an anomaly score that was output by a machine learning model 1206 submit a candidate vector or other input to a machine learning model 1208 select an anchor event 1210 select additional events based on an anchor event 1214 detect a precursor condition, e.g., a coarse detector may use signatures or simple statistics or rules to detect a condition which leads to a possible false positive which is then tested by a sequence anomaly detector 1216 trigger testing by a sequence anomaly detector, e.g., after a coarse detector detects a condition which leads to a possible false positive 1218 get a restriction condition, e.g., via a user interface 1220 apply a restriction condition to a history 1222 delimit a candidate event sequence, e.g., by extracting only sequences that meet conditions such as a max number of events 514 or max time between events 516

1224 perform an algorithm 1226 algorithm which learns fixed length feature representations (i.e., vectors) from variable length pieces of text 1228 learn fixed length feature representations (i.e., vectors) from variable length pieces of text; may also be referred to as embedding 1106 or be part of embedding 1106

1230 train a machine learning model without using user identification or session identification data in the training dataset 1232 avoid associating event sequences with actual user or session IDs; this is an example of non-reliance 510 on user identity data 1234 any step discussed in the present disclosure that has not been assigned some other reference numeral 1236 submit a computed anomaly score for subsequent utilization 1238 classify an event sequence as an anomaly 1242 approximate a user session using an extracted event sequence 1244 place continuous values into categorical buckets 1246 categorical buckets Operating Environments With reference to FIG. 1, an operating environment 100 for an embodiment includes at least one computer system 102. The computer system 102 may be a multiprocessor computer system, or not. An operating environment may include one or more machines in a given computer system, which may be clustered, client-server networked, and/or peer-to-peer networked within a cloud.

An individual machine is a computer system, and a group of cooperating machines is also a computer system. A given computer system 102 may be configured for end-users, e.g., with applications, for administrators, as a server, as a distributed processing node, and/or in other ways.

Human users 104 may interact with the computer system 102 by using displays, keyboards, and other peripherals 106, via typed text, touch, voice, movement, computer vision, gestures, and/or other forms of I/O. A screen 126 may be a removable peripheral 106 or may be an integral part of the system 102. A user interface may support interaction between an embodiment and one or more human users. A user interface may include a command line interface, a graphical user interface (GUI), natural user interface (NUI), voice command interface, and/or other user interface (UI) presentations, which may be presented as distinct options or may be integrated.

System administrators, network administrators, cloud administrators, security analysts and other security personnel, operations personnel, developers, testers, engineers, auditors, and end-users are each a particular type of user 104. Automated agents, scripts, playback software, devices, and the like acting on behalf of one or more people may also be users 104, e.g., to facilitate testing a system 102. Storage devices and/or networking devices may be considered peripheral equipment in some embodiments and part of a system 102 in other embodiments, depending on their detachability from the processor 110. Other computer systems not shown in FIG. 1 may interact in technological ways with the computer system 102 or with another system embodiment using one or more connections to a network 108 via network interface equipment, for example.

Each computer system 102 includes at least one processor 110. The computer system 102, like other suitable systems, also includes one or more computer-readable storage media 112. Storage media 112 may be of different physical types. The storage media 112 may be volatile memory, non-volatile memory, fixed in place media, removable media, magnetic media, optical media, solid-state media, and/or of other types of physical durable storage media (as opposed to merely a propagated signal or mere energy). In particular, a configured storage medium 114 such as a portable (i.e., external) hard drive, CD, DVD, memory stick, or other removable non-volatile memory medium may become functionally a technological part of the computer system when inserted or otherwise installed, making its content accessible for interaction with and use by processor 110. The removable configured storage medium 114 is an example of a computer-readable storage medium 112. Some other examples of computer-readable storage media 112 include built-in RAM, ROM, hard disks, and other memory storage devices which are not readily removable by users 104. For compliance with current United States patent requirements, neither a computer-readable medium nor a computer-readable storage medium nor a computer-readable memory is a signal per se or mere energy under any claim pending or granted in the United States.

The storage medium 114 is configured with binary instructions 116 that are executable by a processor 110; "executable" is used in a broad sense herein to include machine code, interpretable code, bytecode, and/or code that runs on a virtual machine, for example. The storage medium 114 is also configured with data 118 which is created, modified, referenced, and/or otherwise used for technical effect by execution of the instructions 116. The instructions 116 and the data 118 configure the memory or other storage medium 114 in which they reside; when that memory or other computer readable storage medium is a functional part of a given computer system, the instructions 116 and data 118 also configure that computer system. In some embodiments, a portion of the data 118 is representative of real-world items such as product characteristics, inventories, physical measurements, settings, images, readings, targets, volumes, and so forth. Such data is also transformed by backup, restore, commits, aborts, reformatting, and/or other technical operations.

Although an embodiment may be described as being implemented as software instructions executed by one or more processors in a computing device (e.g., general purpose computer, server, or cluster), such description is not meant to exhaust all possible embodiments. One of skill will understand that the same or similar functionality can also often be implemented, in whole or in part, directly in hardware logic, to provide the same or similar technical effects. Alternatively, or in addition to software implementation, the technical functionality described herein can be performed, at least in part, by one or more hardware logic components. For example, and without excluding other implementations, an embodiment may include hardware logic components 110, 128 such as Field-Programmable Gate Arrays (FPGAs), Application-Specific Integrated Circuits (ASICs), Application-Specific Standard Products (ASSPs), System-on-a-Chip components (SOCs), Complex Programmable Logic Devices (CPLDs), and similar components. Components of an embodiment may be grouped into interacting functional modules based on their inputs, outputs, and/or their technical effects, for example.

In addition to processors 110 (e.g., CPUs, ALUs, FPUs, and/or GPUs), memory/storage media 112, and displays 126, an operating environment may also include other hardware 128, such as batteries, buses, power supplies, wired and wireless network interface cards, for instance. The nouns "screen" and "display" are used interchangeably herein. A display 126 may include one or more touch screens, screens responsive to input from a pen or tablet, or screens which operate solely for output. In some embodiments peripherals 106 such as human user I/O devices (screen, keyboard, mouse, tablet, microphone, speaker, motion sensor, etc.) will be present in operable communication with one or more processors 110 and memory.

In some embodiments, the system includes multiple computers connected by a wired and/or wireless network 108. Networking interface equipment 128 can provide access to networks 108, using network components such as a packet-switched network interface card, a wireless transceiver, or a telephone network interface, for example, which may be present in a given computer system. Virtualizations of networking interface equipment and other network components such as switches or routers or firewalls may also be present, e.g., in a software defined network or a sandboxed or other secure cloud computing environment. A given embodiment may also communicate technical data and/or technical instructions through direct memory access, removable nonvolatile storage media, or other information storage-retrieval and/or transmission approaches.

One of skill will appreciate that the foregoing aspects and other aspects presented herein under "Operating Environments" may form part of a given embodiment. This document's headings are not intended to provide a strict classification of features into embodiment and non-embodiment feature sets.

One or more items are shown in outline form in the Figures, or listed inside parentheses, to emphasize that they are not necessarily part of the illustrated operating environment or all embodiments, but may interoperate with items in the operating environment or some embodiments as discussed herein. It does not follow that items not in outline or parenthetical form are necessarily required, in any Figure or any embodiment. In particular, FIG. 1 is provided for convenience; inclusion of an item in FIG. 1 does not imply that the item, or the described use of the item, was known prior to the current innovations.

More About Systems

With reference to FIGS. 1 through 10, some embodiments use or provide a functionality-enhanced system 400 in or for a guarded computing system (GCS) 130. The GCS may be any computing system 102 having events 204 which are documented and available from one or more event list sources 214. The functionality enhancement promotes cybersecurity by providing event sequence anomaly scores which may be utilized to reduce or avoid spending computational resources and personnel time on false positives, thus allowing better focus on actual threats or attacks.

Figure 2:
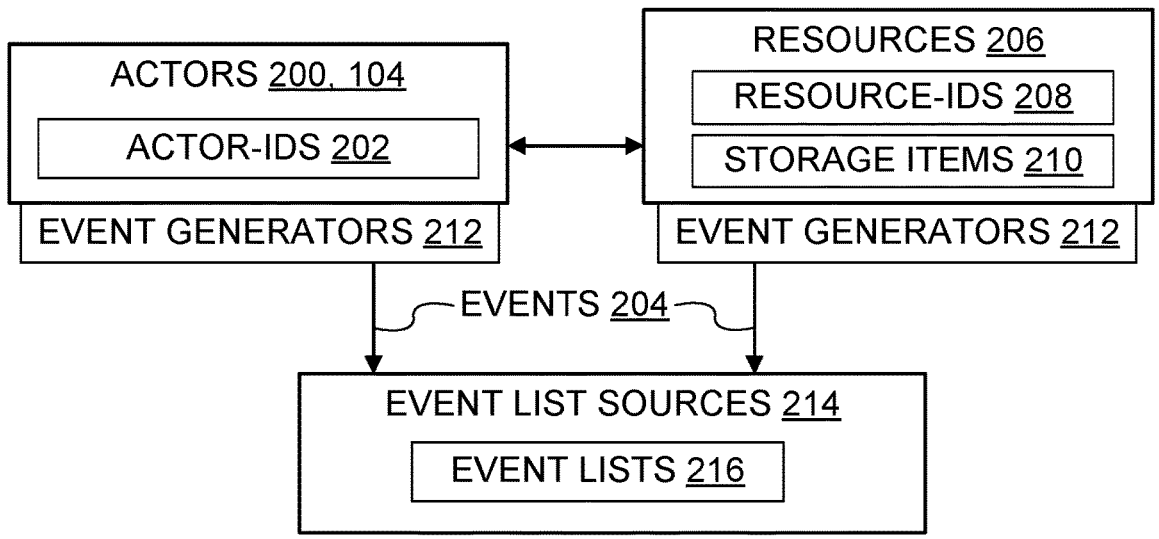
FIG. 2 is a block diagram illustrating some aspects of events, actors, and resources in a computing system.

As illustrated in FIG. 2, an actor 200 documented in an event 204 may include or be associated with one or more users 104. An actor 200 has one or more actor IDs 202. For example, an individual user may have actor IDs that include a username or user account number, which is used for multiple accesses, and may be attempting a particular access with a request 1022, 204 that originates from an application program 124 that is using a particular source IP address and source port. As another example, an actor 200 may be a program, such as a file transfer program, which authenticated anonymously (no username, or generic username such as "guest") but nonetheless sends the access request 1022 using a particular source IP address and source port. The access request 1022 seeks access to one or more items 210 in storage, and includes a storage item ID 208 to identify the item(s) for which access is requested. Permissions may be associated with the actor (e.g., a token), with the storage item (e.g., an ACL or file system permission), or both.

An "actor ID" 202 is a characteristic, property, attribute, or other value associated with a user, device, or other entity referenced in an event 204. In particular, an actor ID may identify an actor that is seeking access to a storage item or other resource 206. Some examples of actor IDs 202 include a source IP address, source port number for TCP or UDP or another transport protocol, an alphanumeric username, a user agent ID, a user group ID, a user role ID, an internal user account ID, a device identifier such as an IP address or MAC address, a service identifier, or a process identifier.

Some examples of actors 200 documented in events 204 may include users 104, groups such as workgroups, individual IP addresses (IPv4 or IPv6) and IP address ranges (e.g., 10.0.0.0-10.255.255.255, 192.168.0.15/24, 2001:db8:: 1:0:0:1), roles recognized for security purposes, ports, accounts, software agents, devices 102, services 426, and processes.

In some embodiments, a "storage item" is a unit of storage allocation identified in an access request 1022 from an actor 200. Individual bits and bytes are storage, but in most computing systems they cannot be individually allocated, so they are not units of storage allocation and hence they are not—individually—storage items. It is expected that many, perhaps most, storage items 210 will be logical or virtual as opposed to a physical cluster or sectors; they will be defined at a level that is visible to end users 104 as individual items, e.g., as a file or blob or table. Some examples of storage items 210 include files, objects, blocks, blobs, logs, containers, tables, queues, databases, and network interfaces.

It is expected that in many environments of interest, storage items 210 will be located in a cloud 424 as cloud-based storage items which are allocated by a cloud service 426 using infrastructure 428. In a given situation, the infrastructure 428 may provide redundancy through parity, replication, or other mechanisms, and may provide access efficiencies through load balancing or decisions about which devices actually hold the stored data, for example. The infrastructure 428 also maps between physical storage devices and the logical view of a storage item that is presented to users. However, the teachings herein are not limited to use cases focused on cloud storage. Resources 206 and events 204 may also, or alternatively, identify or control or include or otherwise involve one or more of the following: process creation or other events on a virtual machine 430, web server events 204, cloud administration events 204 such as resource 206 creation or permission modification or authentication or usage monitoring, database-related events 204, events in computing systems 130 which occur outside a cloud, embedded devices 130, industrial process control devices 130, Internet of Things devices 130, and use cases which are not specifically called out herein but are nonetheless compatible with the teachings provided.

Figure 3:
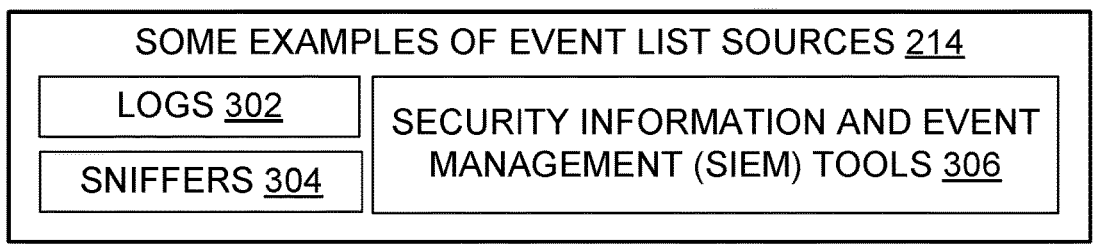
FIG. 3 is a block diagram illustrating some examples of event list sources.

FIG. 3 illustrates examples of event list sources. Illustrated examples include logs 302, e.g., syslog format logs, event tracing logs, application logs, logs generated by kernels, transaction logs, and other records of events which occurred or report state of one or more machines 102. A log is often ordered chronologically, but a composite log may include events from machines whose timestamps are not fully synchronized, and thus may be only partially ordered. Illustrated examples of event list sources 214 also include sniffers 304, which is defined broadly above to include more than merely network analyzers, and SIEM tools 306.

Figure 4:
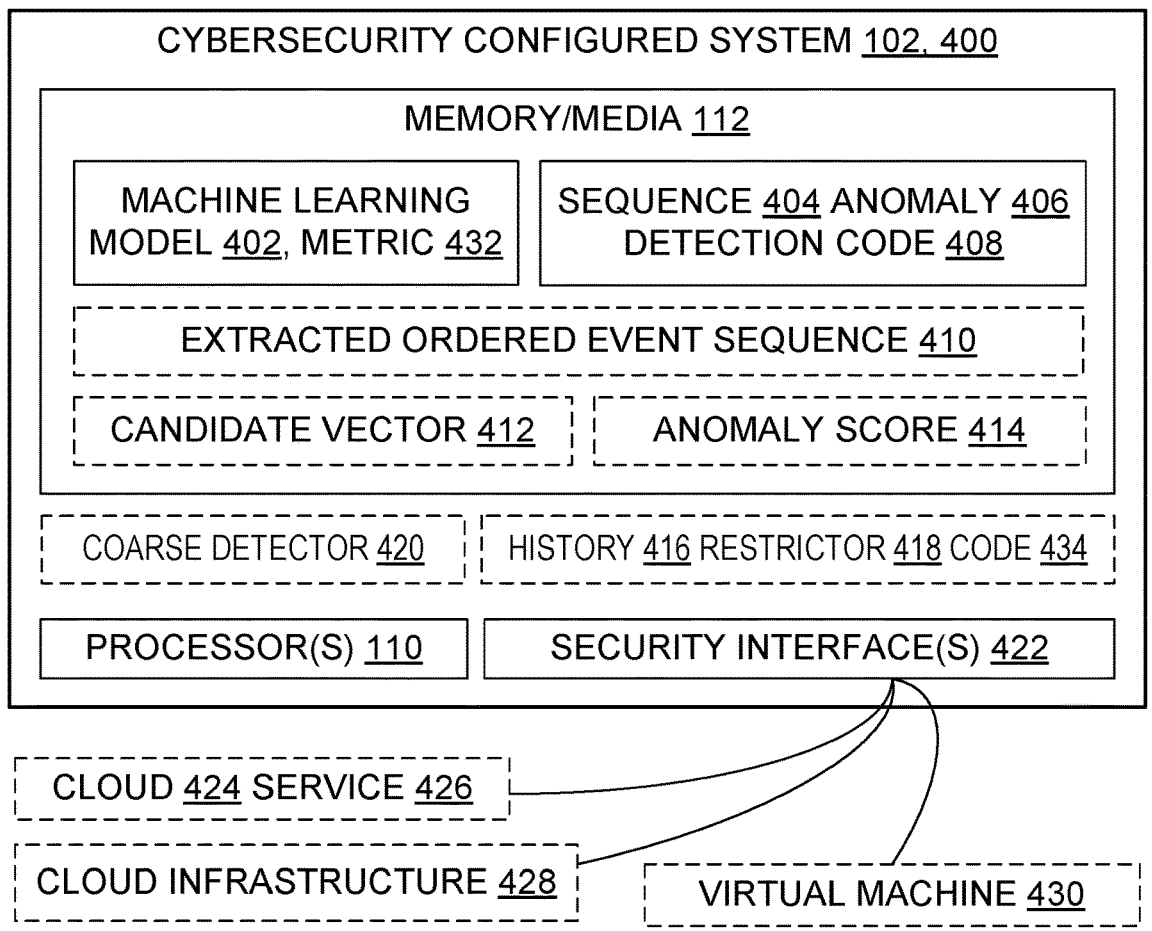
FIG. 4 is a block diagram illustrating aspects of a system which is configured for cybersecurity using anomalous sequence detection functionality.
Figure 5:
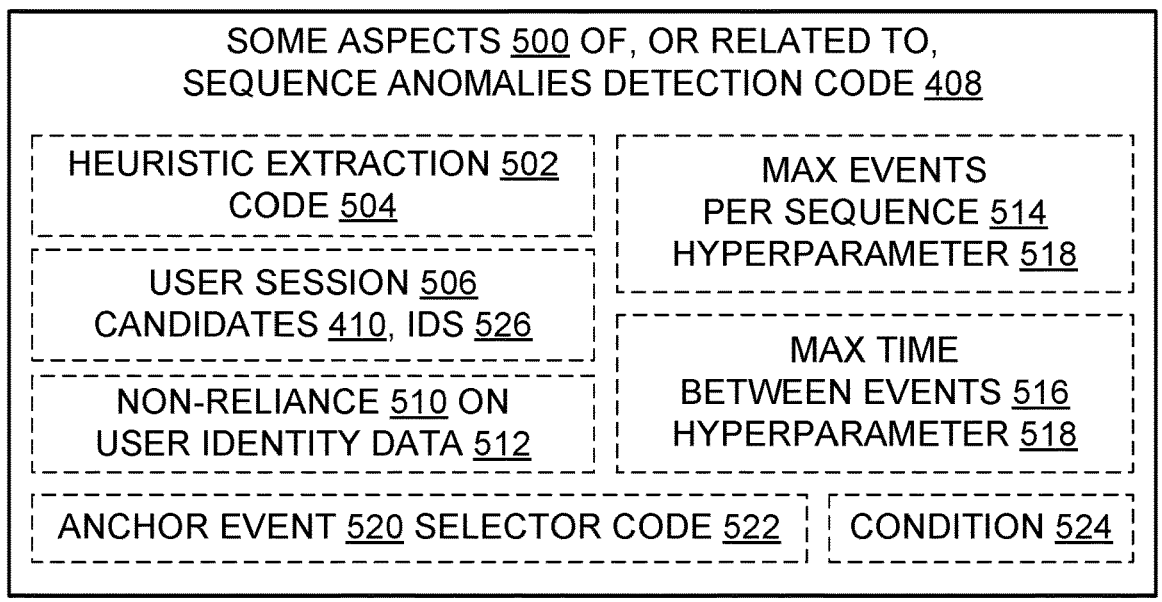
FIG. 5 is a block diagram illustrating some aspects of sequence anomalies detection code.

FIGS. 4 and 5 help illustrate a system 102 which is configured with cybersecurity enhancements according to some of the teachings herein to provide a cybersecurity configured system 400. A sequence anomaly detection code 408 uses a machine learning model 402 to produce anomaly scores 414 for respective candidate vectors 412. Each candidate vector 412 represents an extracted sequence 410 of events 204, which may reference various performed operations or requested operations involving machines 102, 430 and resources 206. The sequence anomaly detection code 408 may contain, reside in, or communicate with one or more cloud 424 components, or other components of an environment 100, e.g., intrusion detection using the sequence anomaly detection code 408 and machine learning model 402 may be provided as a service 426 or as part of an infrastructure 428. The sequence anomaly detection code 408 or machine learning model 402 or both may instead or in addition reside in a virtual machine 430, e.g., in a virtual firewall.

FIG. 5 illustrates some examples of aspects 500 related to the sequence anomaly detection code 408. Illustrated examples include code 504 which performs heuristic extraction 502 of approximate user session 506 sequences 410 from event lists 216, also referred to as candidate sequences 410. Illustrated examples also include hyperparameters 518 for extraction 502, including a constraint 514 on candidate sequence length and a constraint 516 on the span of time covered by events in a candidate sequence 410. The first event 204 extracted into a candidate sequence is called the "anchor" event 520. Anchor event selection code 522 may choose an event 204 identified in an alert from a coarser or trigger detector, for example, or an event which is next in the listing after previously extracted events.

Figure 6:
FIG. 6 is a block diagram illustrating some items related to privacy.

FIG. 6 illustrates some privacy-related items 600. Illustrated examples include session identifiers 526, actor-ids 202, and privacy policies 604. Privacy protections 604 may drive a lack of identifications in events 204, which creates technical challenges for user behavior analytics that normally sort and process behaviors on a per-user basis to compare the behaviors of different users and thus identify anomalies. However, tools and techniques described herein support behavior analytics without also increasing risk to privacy, by approximating 1242 user sessions heuristically without relying on use of identifications 202, 526.

Figure 7:
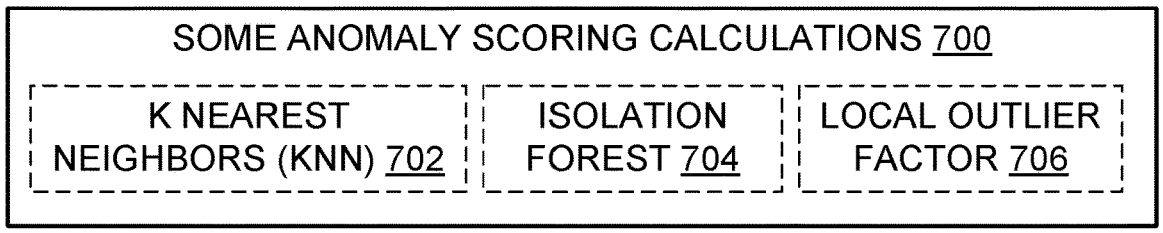
FIG. 7 is a block diagram illustrating some items related to calculating anomaly scores.

FIG. 7 illustrates some calculations 700 that may be used in a machine learning model 402 to compute an anomaly score. Illustrated examples include K nearest neighbors 702, isolation forest 794, and local outlier factor 706. However, other metrics or similarity measures 432 may also be used.

Figure 8:
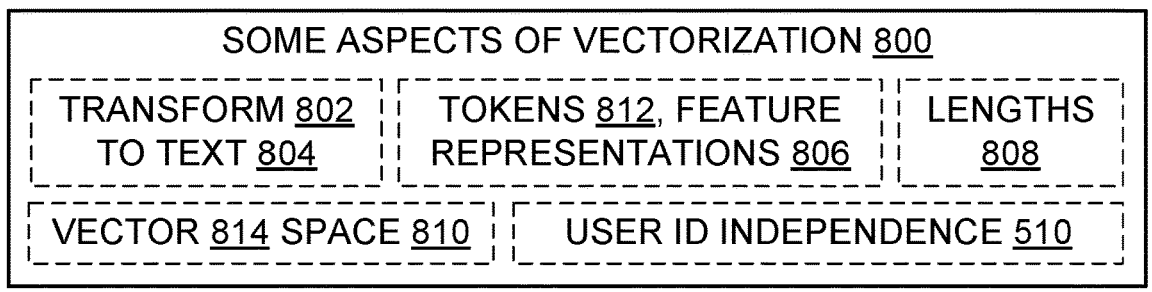
FIG. 8 is a block diagram illustrating some aspects of vectorization.
Figure 9:
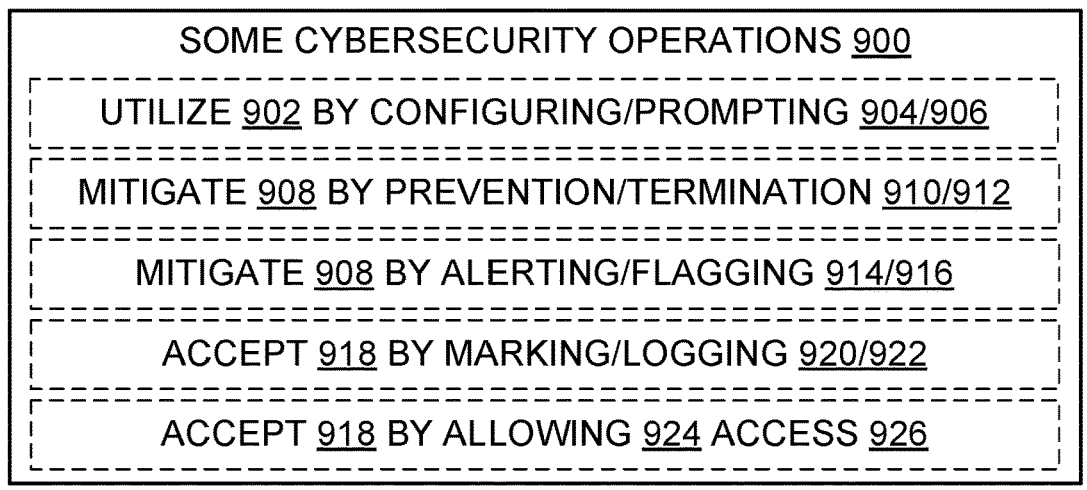
FIG. 9 is a block diagram illustrating some examples of cybersecurity actions (also referred to as "cybersecurity operations")

FIG. 8 illustrates some examples of aspects related to the vectorization 800 of event sequences 410. Illustrated examples include transformation 802 of events 204 into text 804, resultant feature representations 806, and vector spaces 810. Lengths 808 may also be worth noting, at least to the extent of distinguishing between variable length items and fixed length items.

FIG. 8 illustrates some examples of cybersecurity operations 900. Illustrated examples include risk acceptance actions 918 which accept 918 a risk R 1018, and risk mitigation 908 actions 908 which aids mitigation 908 of the risk R 1018. R denotes a risk 1018 that the scored candidate sequence represents an unauthorized sequence of events, e.g., an unauthorized attempt by an actor 200 to access a resource 206. Examples of cybersecurity operations 900 also include utilizing 902 an anomaly score 414 by configuring 904 software or by prompting 906 an investigation.

In particular, cybersecurity operations 900 may include performing 1110 at least one of the following cybersecurity actions 900 based at least in part on the anomaly score: mitigating 908 a risk by preventing 910 or terminating 912 access by an actor to a resource, mitigating 908 a risk by alerting 914 an administrator, mitigating 908 a risk by alerting 914 a security tool, mitigating 908 a risk by flagging 916 an actor or a resource or both as a candidate for further security investigation, accepting 918 a risk by marking 920 the event sequence 410 or its vector 412 as accepted, accepting 918 a risk by logging 922 the event sequence 410 or its vector 412 as accepted, accepting 918 a risk by allowing 924 an actor to access a resource, or accepting 918 a risk by allowing 924 an actor to continue an access to a resource which has started.

Some embodiments use or provide a cybersecurity system 400 which includes a processor 110, a memory 112 in operable communication with the processor, an event listing source 214 which is configured to provide one or more lists 216 of events 204 which represent occurrences or states or both in a guarded computing system (GCS) 130, and a sequence anomalies detection code 408. Upon execution with the processor, the sequence anomalies detection code 408 performs operations that include (a) obtaining 1202 a list of events from the event listing source, (b) heuristically extracting 502 an ordered event sequence 410 from the list of events as a user session candidate without reliance 510 on user identity data 512, (c) producing a candidate vector 412 by vectorizing 800 the extracted ordered event sequence, (d) submitting 1206 the candidate vector to a machine learning model 402 which computes 1108 an anomaly score 414 for the candidate vector, (e) receiving 1204 the computed anomaly score, and (f) utilizing 902 the computed anomaly score to enhance cybersecurity of the GCS. The machine learning model 402 was trained 1008 using previously vectorized ordered event sequences which collectively represent a history 416 of GCS events.

In some embodiments, the sequence anomalies detection code 408 includes a max-events-per-sequence limit 514 which is at least three, and also includes heuristic sequence extraction code 504. Upon execution by a processor 110, the code 504 extracts 502 the ordered event sequence 410 from the event list 216 by (a) selecting 1208 at least one anchor event 520, 204 from the list of events, and (b) selecting 1210 zero or more additional events 204 from the list of events up to a total number of no more than max-events-per-sequence 514 selected events. In some variations, the max-events-per-sequence limit 514 is at least four, at least five, or at least ten. In some variations, the code 504 selects 1210 one or more additional events 204, selects two or more additional events 204, or selects three or more additional events 204.

In some embodiments, the sequence anomalies detection code 408 includes a max-time-between-events limit 516 which is in a range from one nanosecond to ten minutes, and also includes heuristic sequence extraction code 504. Upon execution by a processor 110, the code 504 extracts 502 the ordered event sequence 410 from the event list 216 by (a) selecting 1208 at least one anchor event 520, 204 from the list of events, and (b) selecting 1210 additional events from the list of events subject to the time constraint 516. One or more anchor events may be selected 1208 because they are the events next up in the log after the last events that were extracted, or the events highlighted by a coarse detector, for instance. An embodiment could select 1210 consecutive events or a neighborhood around an anchor, or do both, and event selection may be subject to filtering. In some embodiments, each selected event has an associated timestamp, and the difference between timestamps of any two consecutive selected events when the selected events are ordered by timestamp value is no more than max-time-between-events 516. In some, the difference between timestamps of the earliest and latest selected events is no more than max-time-between-events 516.

In some embodiments, the system 400 includes a coarse detector 420 having precursor detection code which upon execution detects a precursor condition 524 in a list of events 204 from the event listing source 214. This system 400 is configured such that the coarse detector triggers 1216 execution of the sequence anomalies detection code 408. For example, a coarse detector 420 may use an approach which tends to generate a relatively large amount of false positive alerts, such as applying one or more of the following as a precursor condition 524: simple rules (e.g., alert on any activity except a backup which occurs between midnight and 6:00 am), simple patterns (e.g., alert on any packet whose source IP address is on a list of suspect or low-reputation IP addresses), or simple statistics (e.g., alert when the number of packets reaching a firewall or a proxy is more than one standard deviation away from a moving average). Such alerts could then trigger 1216 execution of the sequence anomalies detector 408. For instance, the coarse detector 420 could trigger 1216 the sequence anomalies detector 408 by passing anchor events 520 to the sequence anomalies detector 408, e.g., an event 520 identifying the packet whose source IP address is on a list of suspect or low-reputation IP addresses, or an event 520 reciting the number of packets that reached the firewall or a proxy and the moving average, or N events 520 sampled from the activity which occurred between midnight and 6:00 am, where N is a specified threshold 1020.

In some embodiments, the system 400 includes a dynamic restriction code 434 which upon execution gets a restriction condition 418 which is satisfied by a proper subset of the history 416 of GCS events 204. The trained machine learning model 402 upon execution computes 1108 the anomaly score 414 for the candidate vector 412 without using previously vectorized ordered event sequences (sequences per se, or vectors 806, 1002 corresponding to them) which are outside the proper subset. In effect, only a part of the model's vector space 810 is used in computing the anomaly score 414 in this situation. This allows the system to efficiently and effectively check candidate sequences 410 for anomalousness relative to different histories 416. For example, a sequence of writes to system files might be anomalous with regard to an overall history 416, but be typical (or at least non-anomalous) with respect to a history 416 of events occurring during scheduled updates, e.g., on so-called "Patch Tuesday".

In some embodiments, the trained machine learning model 402, which upon execution computes the anomaly score for the candidate vector using previously vectorized ordered event sequences, was trained 1008 using one or more ordered event sequences whose length 808 as text 804 differs from a length 808 of the extracted ordered event sequence as text 804. In other words, the model training uses sequences that combine to form text of one or more lengths, and the candidate sequence forms text of some different length.

Embodiments described herein may be part of a defense in depth approach to cybersecurity, by using coarse detectors 420 or otherwise. Embodiments are generally compatible with other security mechanisms. In particular, using embodiments taught herein does not necessarily prevent or inhibit usage of different tools or techniques for reducing cyberattack impact, e.g., multifactor authentication, good password hygiene, signature-based intrusion detection, separation of duties, and so on. Multiple security tools and techniques may be combined, e.g., in an offering such as Microsoft's Azure® ATP (Advanced Threat Protection) solution (mark of Microsoft Corporation).

Other system embodiments are also described herein, either directly or derivable as system versions of described processes or configured media, informed by the extensive discussion herein of computing hardware.

Although specific architectural examples are shown in the Figures, an embodiment may depart from those examples. For instance, items shown in different Figures may be included together in an embodiment, items shown in a Figure may be omitted, functionality shown in different items may be combined into fewer items or into a single item, items may be renamed, or items may be connected differently to one another.

Examples are provided herein to help illustrate aspects of the technology, but the examples given within this document do not describe all of the possible embodiments. Embodiments are not limited to the specific configurations, implementations, arrangements, displays, features, approaches, or scenarios provided herein. A given embodiment may include additional or different technical features, mechanisms, sequences, data structures, or functionalities for instance, and may otherwise depart from the examples provided herein.

Processes (a.k.a. Methods)

FIG. 10 illustrates data flow in some embodiments, and thus helps illustrate both systems and methods. One of skill will acknowledge that a given embodiment may include both phases shown (model creation 1014 and model utilization 1016), or include only one of those phases. Also, the different phases 1014, 1016 may be implemented at different locations, different times, by different entities, or a mixture of such differences. Also, some of the flows shown may be repeated, e.g., an embodiment may loop through training 1008, testing 1010, and tuning 1012 multiple times. Steps may be reordered, e.g., testing 1010 may be done after tuning 1012. Steps may be repeated, or omitted.

FIG. 11 illustrates a method 1100 which is an example of methods performed or assisted by a model 402 and sequence anomaly detector 408. This method includes acquiring 1102 an event sequence 410 to test 1104 for anomalies, e.g., by receiving or otherwise selecting 1208 an anchor event and selecting 1210 additional events. Then a corresponding vector to score is formed, e.g., by vectorizing 800 the event sequence 410 and embedding 1106 the vector in a vector space by submitting 1206 the vector to the model 402. Next, the method computes 1108 an anomaly score 414, e.g., by using leveraged implementations of machine learning libraries which implement calculations 700. Then the system 400 or related components 426, 428, 430, 122 performing the method 1100 take 1110 some action 900 based on the anomaly score. Some possible actions 900 include preventing 910 access to the storage item or resource identified in a request 1022, terminating 912 an access-in-progress to the storage item or resource identified in a request, configuring 904 a firewall, IDS, or other tool 122, alerting 914 an administrator (a person), or actively allowing 924 the access after comparison of the anomaly score to pertinent threshold(s) 1020.

FIG. 12 further illustrates cybersecurity methods, including refinements, supplements, or contextual actions for steps shown in FIG. 11. Technical processes shown in the Figures or otherwise disclosed will be performed automatically, e.g., by cybersecurity system 400, unless otherwise indicated. Processes may also be performed in part automatically and in part manually to the extent action by a human administrator or other human person is implicated, e.g., in some embodiments a person may set thresholds 1020 that determine which action 900 is taken. No process contemplated as innovative herein is entirely manual. In a given embodiment zero or more illustrated steps of a process may be repeated, perhaps with different parameters or data to operate on. Steps in an embodiment may also be done in a different order than the top-to-bottom order that is laid out in FIGS. 11 and 12. Steps may be performed serially, in a partially overlapping manner, or fully in parallel. In particular, the order in which flowchart 1100 action items or flowchart 1200 action items are traversed to indicate the steps performed during a process may vary from one performance of the process to another performance of the process. The flowchart traversal order may also vary from one process embodiment to another process embodiment. Steps may also be omitted, combined, renamed, regrouped, be performed on one or more machines, or otherwise depart from the illustrated flow, provided that the process performed is operable and conforms to at least one claim.

Some embodiments use or provide a cybersecurity method which includes acquiring 1102 a candidate event sequence to be tested 1104 for anomalousness. Events 204 in the candidate event sequence represent occurrences (e.g., alert generated, read request received) or states (e.g., error codes, device response or status code) or both in a guarded computing system (GCS) 130. The method also includes vectorizing 800 the candidate event sequence at least in part by embedding 1106 the candidate event sequence in a vector space, thereby producing a candidate vector. This vectorizing is independent 510 of any association of user account identification with events of the candidate event sequence. The method also includes computing 1108 an anomaly score for the candidate vector using a machine learning model which was trained 1008 with previously vectorized event sequences which collectively represent a history of events in the GCS, or otherwise measure anomalousness using such a history 416. The method also includes utilizing 902 the computed anomaly score of the candidate vector by performing 1110 at least one of the following cybersecurity operations 900 based at least in part on the computed anomaly score: configuring 904 an intrusion detection tool to detect GCS intrusion, configuring 904 an intrusion prevention tool to prevent GCS intrusion, configuring 904 an administrative interface to facilitate administration of the GCS, configuring 904 a data loss prevention tool to prevent data loss from the GCS, configuring 904 a security information and event management tool which monitors the GCS, configuring 904 a cybersecurity tool which generates alerts about the GCS based at least in part on anomaly scores, or prompting 906 an investigation of the GCS by a security analyst or other human security personnel or an automated security investigator.

In some embodiments, acquiring 1102 a candidate event sequence includes heuristically extracting 502 the candidate event sequence from a list of events. Heuristically extracting 502 the candidate event sequence may include delimiting 1222 the candidate event sequence, based on at least one of the following sequence delimiting parameters: a limit 514 on the maximum number of events allowed in the candidate event sequence, or a limit 516 on the maximum time allowed between any two consecutive events in the candidate event sequence, or a limit 516 on the maximum time allowed between an earliest event in the candidate event sequence and a latest event in the candidate event sequence.

In some embodiments, vectorizing 800 the candidate event sequence includes transforming 802 the candidate event sequence into a single piece of text, and performing on the single piece of text an algorithm 1226 that learns fixed-length feature representations from variable-length pieces of text. Some suitable algorithms 1226 in a given embodiment may include a doc2vec algorithm, a word2vec algorithm, a GloVe (global vectors for word representation) algorithm, or dependency-based word embeddings.

In some embodiments, the method includes getting 1218 a restriction condition, and restricting 1220 the history based on the restriction condition, thereby defining a restricted history. These methods also include computing 1108 a focused anomaly score for the candidate vector, while using from the history only the restricted history portion of the history, and utilizing 902 the focused anomaly score of the candidate vector by performing one or more cybersecurity operations.

In some of these embodiments, restricting 1220 includes restricting the history to meet at least one of the following restriction conditions: all events in any sequence represented in the restricted history originated from the same IP address, all events in any sequence represented in the restricted history originated from the same IP address range, all events in any sequence represented in the restricted history originated from the same application program, all events in any sequence represented in the restricted history originated from the same application program interface, all events in any sequence represented in the restricted history originated from the same device, or all events in any sequence represented in the restricted history originated from the same service.

In some embodiments, computing 1108 an anomaly score for the candidate vector includes using at least one of the following: a k nearest neighbors calculation 702, an isolation forest calculation 704, or a local outlier factor calculation 706.

Some embodiments include training 1008 the machine learning model using vectorized event sequences without using any association of particular event sequences with particular user accounts. Some include training 1008 the machine learning model using vectorized event sequences without using logged session ids. Some do both of these kinds of non-reliance 510 training 1008.

Some embodiments avoid 510 associating particular event sequences with particular user accounts. In some, this non-reliance 510 is based on at least one of the following conditions: presence of a privacy policy 604, a lack of user account identification 202 at a location where events are logged, a lack of logged session 506 ids 526.

In some embodiments, acquiring 1102 the candidate event sequence to be tested for anomalousness includes acquiring a set of storage 210 service 426 requests 1022 which do not associate user information 512, 526, 202 with each request.

Configured Storage Media

Some embodiments include a configured computer-readable storage medium 112. Storage medium 112 may include disks (magnetic, optical, or otherwise), RAM, EEPROMS or other ROMs, and/or other configurable memory, including in particular computer-readable storage media (which are not mere propagated signals). The storage medium which is configured may be in particular a removable storage medium 114 such as a CD, DVD, or flash memory. A general-purpose memory, which may be removable or not, and may be volatile or not, can be configured into an embodiment using items such as machine learning models 402 trained on event sequence data, sequence anomaly detection code 408, event sequences 404, extracted event sequences 410, 404, vectors 814, candidate vectors 412, 814, anomaly scores 414, hyperparameters 518, restriction conditions 418, restricted histories 416, and vectorization 800 code, in the form of data 118 and instructions 116, read from a removable storage medium 114 and/or another source such as a network connection, to form a configured storage medium. The configured storage medium 112 is capable of causing a computer system 400 to perform technical process steps for event sequence anomaly detection and anomaly-score-responsive cybersecurity actions, as disclosed herein. The Figures thus help illustrate configured storage media embodiments and process (a.k.a. method) embodiments, as well as system and process embodiments. In particular, any of the process steps illustrated in FIG. 11 or 12, or otherwise taught herein, may be used to help configure a storage medium to form a configured storage medium embodiment.

Some embodiments use or provide a storage medium 112, 114 configured with code which upon execution by one or more processors performs a cybersecurity method, including: obtaining 1202 a list of events from an event listing source, events in the list representing occurrences or states or both in a guarded computing system (GCS); heuristically extracting 502 a candidate event sequence from the list of events; vectorizing 800 the candidate event sequence at least in part by embedding 1106 the candidate event sequence in a vector space, thereby producing a candidate vector; computing 1108 an anomaly score for the candidate vector using a machine learning model 402, and also using vectorized event sequences which collectively represent a history of events in the GCS; and submitting 1236 the computed anomaly score of the candidate vector for utilization 902 by at least one cybersecurity operation.

Some suitable cybersecurity operations include configuring 904 an intrusion detection tool 122 to detect GCS intrusion, configuring 904 an intrusion prevention tool 122 to prevent GCS intrusion, configuring 904 an administrative interface 428 to facilitate GCS administration, configuring 904 a data loss prevention tool 122 to prevent data loss from the GCS, configuring 904 a security information and event management tool 122 which monitors the GCS, configuring 904 a cybersecurity tool 122 which generates alerts 914 about the GCS based at least in part on anomaly scores, or prompting 906 an investigation of the GCS by a security analyst 1024 or another human security investigator 1024 or automated security investigator 122.

In some embodiments, the method further includes getting 1218 a restriction condition; restricting 1220 the history based on the restriction condition, thereby defining a restricted history; computing 1108 a focused anomaly score for the candidate vector, while using from the history only the restricted history portion of the history, without retraining the machine learning model; and submitting 1236 the focused anomaly score for utilization by one or more cybersecurity operations. Submission 1236 may include transmitting the anomaly score to a cybersecurity tool 122 or an administrator 104, for example.

In some embodiments, heuristically extracting 502 the candidate event sequence includes enforcing at least one of the following sequence delimiting 1222 parameters 1020: a limit 514 on the maximum number of events allowed in the candidate event sequence with said limit in the range from three to one hundred events, a limit 516 on the maximum time allowed between any two consecutive events in the candidate event sequence with said limit in the range from one millisecond to five minutes, or a limit 516 on the maximum time allowed between an earliest event in the candidate event sequence and a latest event in the candidate event sequence is in the range from three seconds to three minutes.

In some embodiments, the method further includes classifying 1238 the candidate event sequence as an anomaly 406 based at least in part on the computed anomaly score. In some of these embodiments, the candidate event sequence includes a sequence containing at least five read attempts or reads of one or more storage items 210. In some cases, the storage items 210 contain one or more of the following: personally identifiable information, protected health information, financial information, governmentally regulated information, information which has been governmentally classified to restrict access, or restricted access intellectual property. In some embodiments, the candidate event sequence includes a sequence containing at least ten failed attempts to read one or more storage items 210. In some embodiments, the number of read attempts or reads (e.g., five above) is a configurable threshold 1020. In some embodiments, the number of failed attempts (e.g., ten above) is a configurable threshold 1020.

In some embodiments, obtaining 1202 the list of events is triggered 1216 by a communication from a coarser-grained security tool 420, or includes obtaining the list of events from the coarser-grained security tool 420, or both.

Additional Examples and Observations on Training, Utilization

One of skill will recognize that not every part of this disclosure, or any particular details therein, are necessarily required to satisfy legal criteria such as enablement, written description, or best mode. Also, embodiments are not limited to the particular parameters, threshold values, range endpoints, networks, tools, identifiers, fields, data structures, functions, constants, or other implementation choices described herein. Any apparent conflict with any other patent disclosure, even from the owner of the present innovations, has no role in interpreting the claims presented in this patent disclosure. With this understanding, which pertains to all parts of the present disclosure, some additional examples and observations are offered.

Some embodiments provide dynamic and fine-grained sequence anomaly prediction for cybersecurity. In some, an algorithm constructs event sequences which approximate 1242 user sessions 506 based on a given event log. It also constructs 1008 a history model 402 that includes or consists of a set of representations 806 of these sequences. At runtime, the algorithm 402 predicts sequence anomaly based on the trained model. The algorithm 402 provides anomaly prediction of an input sequence 410 compared to the history of all modelled sequences.

As an aside, although some discussions may distinguish between anomaly "prediction" and anomaly "detection", for present purposes they are so closely related as to be informally interchangeable. An anomaly prediction is an anomaly score 414; when the anomaly score 414 passes a specified threshold 1020, an anomaly has been detected.

In addition, the algorithm 402 may enable predictions 414 compared to a dynamically defined subset 1220 of sequences in the model. This capability provides a fine-grained anomaly prediction, which is highly useful to security personnel 1024 for investigation purposes. For example, one may predict an anomaly compared to sequences that used some given IP address 418, or that occurred at a specified time interval 418. Defining subsets dynamically 1220 using a single model 402 relieves the system 400 from pre-training and constructing multiple models upfront, which helps make embodiments highly scalable and saves computation and storage costs.

Some embodiments are made and used as follows. Input to an algorithm 402 is derived from a system's event log 302, which documents a time-series of events 204 that occurred in the system 130. Each record (row) 204 in the event log corresponds to a single event and contains event information such as the operation performed, parameters, and some metadata. For example, a storage event log of interest contains an operation type (e.g., read data), operation parameters (e.g., data size), an error or result code, and metadata such as IP address and storage account identifier.

At a pre-processing stage, one constructs 1008 a model of the desired history. At runtime, given an event sequence, the model returns an anomaly score 414 in the range of [0 . . . 1], such that the larger the score is, the more likely the sequence is anomalous.

As to a model construction stage 1014, one approach uses a heuristic extraction 502 that breaks the log into multiple sequences, where each sequence approximates 1242 a user session 506. An output is a set of sequences 410, each of which was likely performed by a single user 104. Note that this approach does not determine or identify which user performed which sequence.

As an example in a context of a cloud storage system, one extraction 502 partitions the log into event sequences, with each sequence originated by the same IP address and application, each sequence consisting of no more than T 514 subsequent events, and where no more than alpha 516 seconds have passed between any two consecutive events in the sequence. T and alpha are parameters 518 to the algorithm. T denotes the maximal number of subsequent events in a sequence, and alpha denotes the maximal idle time between any two subsequent events in the sequence. One of skill will acknowledge that these delimiters can be enforced in a computationally very efficient manner, allowing efficient heuristic extraction 502. Extraction code 504 does not need to know which user performed which sequence. Also, the sequences are session approximations 1242, so anomalousness can be usefully tested even when a sequence A and a sequence B are actually both part of same session 506.

In this example, the anomaly detection approach embeds 1106 the output sequences into a vector space 810, to represent each sequence 410 as a multi-dimensional vector 1002. The model 402 may be said to thereby learn 1228 a similarity function 432 between the vectors, which returns a similarity score 432 in the range [0 . . . 1] when given two vectors. The larger the similarity score is, the more similar the two sequences are. This similarity function captures sequence similarity semantics: sequences are similar if they share similar events that appear in a similar order. Some embodiments use the doc2vec algorithm for the embedding 1106. This example approach transforms 802 each event sequence into a text document 804 consisting of a sequence of tokens representing the sequence of events. This approach feeds the sequence documents into the doc2vec algorithm, which models them as vectors and learns the desired similarity function.

As further illustration, consider a sequence document which includes: "read_data/dir1/dir2/file3 100-Bytes success list_files/dir1/dir5 failure 0-files list_files/dir1/dir2 success 10-files". This represents a sequence composed of three consecutive events of read_data, list_files, and list_files and their respective parameters and metadata.

This approach models the history 416 of the system 130 by the set of vectors that were learned using doc2vec or another embedding. Denote this set of vectors by H, to facilitate the discussion below. Note that one may construct multiple models 402 from the same log 302, e.g., one could train a separate model per each account in a storage system.

As to a model utilization stage 1016, which may also be viewed as an anomaly prediction stage or runtime, an input may be an unseen event sequence e 410 ("unseen" meaning not part of the training 1008). This approach embeds 1106 e using the embedding algorithm and gets a vector v 412 as an output. This approach feeds H and v into an anomaly prediction algorithm 402 denoted A, which returns v's anomaly score 414 given H as context, i.e., v's anomalousness compared to H. A's output anomaly score is based on the similarity (or lack thereof) between v and the vectors in H. Algorithm A uses the similarity function 432 that was learned 1008 for its prediction, e.g., if v is highly dissimilar to the vectors in H, then v will have a high anomaly score. Some suitable algorithms for implementing A include KNN-based 702, iForest 704, LOF 706, and others.

Some implementations may compute the anomaly score of v compared to a dynamically defined sub-set of H as follows. The algorithm dynamically constructs H' to be a subset of H according to a specified restriction. For example, H' contains all sequences in H that were originated by some given IP address, or all sequences in H that occurred at a specified time interval. The algorithm computes the anomaly score of v given H', by feeding v and H' into A (as discussed above).

More generally, approaches described herein may provide sequence anomaly prediction for cybersecurity in a setting where user information is unavailable. Some provide a fine-grained sequence anomaly prediction for cybersecurity when given a dynamically specified subset of the history. Some provide sequence anomaly prediction for cybersecurity using sequence embedding. Such capabilities can be utilized, e.g., in or by security products that use sequence anomaly prediction as part of their detection or investigation logic.

Additional Examples and Observations on Layering, Embedding

In some cases, a basic anomaly detection algorithm tracks a univariate time series looking for deviations from an expectation. For example, the algorithm may detect an access to storage from an unusual location, or an anomalous read of a large data volume. In this context, a sequence-anomaly algorithm for cloud storage as taught herein may complement the basic, univariate, anomaly detection. A sequence anomaly detection algorithm may be used in a layered defense as an additional standalone detector that triggers alerts upon identifying anomalous event sequences, or may be combined with other detectors. In the latter case, one may use the algorithm for pinpointing anomalous event sequences when an alert (of another detector) is raised. This capability assists security experts in alert investigation.

As discussed, some embodiments include an algorithm that uses a similarity-based approach for anomaly detection. In particular, some approaches taught herein are based in part on the doc2vec document embedding algorithm 1106 which learns an effective similarity metric 432 between event sequences. By using doc2vec's architecture, the learnt similarity considers the context in which events occur, which can be beneficial in assessing sequence similarity. An experiment with appropriately protected actual customer data 118 confirmed that an implementation 400 as taught herein distinguished 1238 between normal and abnormal event sequences. The implementation was combined with a data exfiltration detector 122 which detects abnormal reads of large data volumes, to demonstrate that the implementation assisted in investigating data exfiltration alerts.

Storage Data 210. An Azure® cloud storage service enables customers to define storage accounts which serve as isolated administrative units (mark of Microsoft Corporation). Customers interact with their storage accounts using user-agent applications 124 such as a storage explorer to maintain their data, e.g., to create blobs and containers, and to perform operations such as read, write, and delete. This cloud storage service 426 maintains an event log that records all customer interactions with the storage service. The storage log contains a time series of events 204, where each event record contains event features, e.g., timestamp, operation type, and error code. Each account produces tens to hundreds of thousands of events per hour.

Anomaly Scoring 414 Algorithm. The storage log may be used to model an account's event sequence history. At runtime, given an unseen event sequence, an embodiment algorithm returns an anomaly score in the range [0 . . . 1]. The closer the score is to 1, the more likely the sequence is anomalous. An unsupervised learning algorithm based on the doc2vec document embedding is employed, as discussed below, leveraging a commercially available doc2vec implementation.

Sequence 410 Construction. In order to model meaningful event sequences, this embodiment extracts 502, from the log, event sequences that were performed by a single actor. The Azure® cloud storage log used as an event list 216 lacks actor 200 and session 506 identification information due to privacy issues. This embodiment applies the following heuristic 502 which approximates 1242 actor's sessions: define an entity 200 by the tuple 806<ip, port, account, user agent>; define an entity's event sequence 410 as a sequence of up to m events that the entity performed, in which the idle time between events is no more than delta seconds, whereby m and delta are hyperparameters 518 of the algorithm. Event sequences are a basic building block of the model 402.

Model 402 Construction. This embodiment represents an event sequence 410 by a textual document 804: it transforms an event's feature tuple 806<timestamp, authentication type, operation type, error code, account name, IP address, user agent, and response size>into a sequence of corresponding tokens 812, in which each token represents a feature value.

As an aside, this example places 1244 the continuous response size values into categorical buckets 1246 indicating their order of magnitude or other size categorization. Response size is a byte count or other size measurement of a response to a request 1022, and hence at least somewhat continuous in the sense that it may assume a large number if different values. Buckets 1246 could be created, e.g., with respective response size ranges of 0 bytes, 1 . . . 100 bytes, 101 . . . 511 bytes, 512 . . . 1023 bytes, 1K . . . 10K bytes, and 10K or greater bytes. Of course, other buckets categories may also be used, and buckets may be used for values other than or in addition to request response sizes.

Each sequence-based document contains or consists of a sequence of events, where each event is represented by a sequence of tokens 812. The following an example of an event sequence document 804:
authenticated, GetBlob, Success, 206, 6.0,
authenticated, GetBlob, Success, 206, 6.0, sas, PutPage, SASSuccess, 201, 0,
authenticated, GetBlobProperties, ContainerNotFound, 404, 0,
authenticated, GetBlobProperties, Success, 200, 0,
anonymous, GetBlob, Success, 200, 9.0
(In the sequence above, "sas" and "SASSuccess" refer to an Azure® shared access signatures security mechanism.)

This embodiment constructs an account's model by feeding 1224 its event sequence documents into the doc2vec algorithm 1226. Doc2vec embeds 1106 the documents into a lower dimensional vector space 810 and learns 1228 a similarity metric 432 between the sequences which considers events' context. The final model 402 contains or consists of sequence vectors 814 and supports an efficient and fast similarity search. This model construction dataflow may be represented as:

[account's events]→[one document per event sequence]→{doc2vec embedding}→[account's model]

Figure 13:
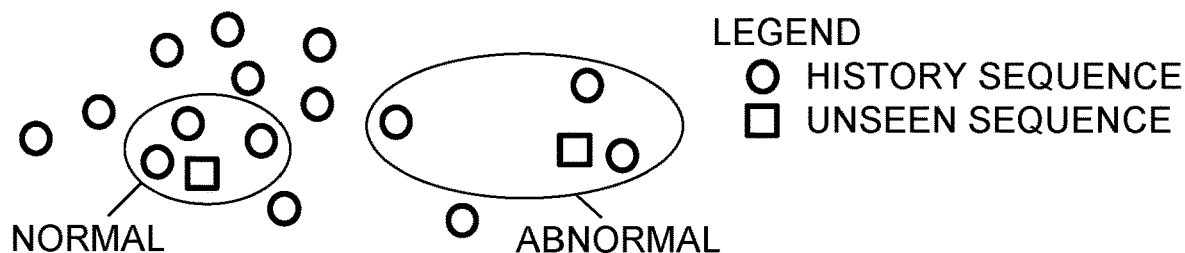
FIG. 13 is a diagram illustrating an anomalous sequence and a non-anomalous sequence in a representation of a vector space where similarity is measured using a k-nearest neighbors calculation, in the particular case of k equal to 3.

Anomaly Prediction. For the prediction, this embodiment uses a k-nearest neighbors (kNN) 702 density-based local anomaly detection algorithm, which works as follows: Given an unseen input event sequence, construct its corresponding document and use doc2vec to infer its vector, which is denoted her as v. Perform a k-nearest neighbor search over the event sequence vectors in the account's model, where k is a hyperparameter 518 of the algorithm. Assign v's anomaly score 414 to be its dissimilarity from its k-th neighbor u, as defined by 1-sim(v,u), where sim(v,u) denotes the similarity between v and u, and 0<=sim(v,u)<=1 for all v,u of interest. FIG. 13 illustrates kNN fork equal to 3, with "normal" corresponding to a sequence classified 1238 as non-anomalous and "abnormal" corresponding to a sequence classified 1238 as anomalous due to the size of its neighborhood relative to a threshold 1020 dividing anomaly scores 414. The "history" sequences in FIG. 13 are in the history 416, and the two "unseen" sequences correspond to candidates 410, 412.

Evaluation. Testing confirmed that this algorithm embodiment captures sequence anomaly by measuring how well it distinguishes between normal and abnormal event sequences. In the absence of labeled data defining normal sequences and abnormal sequences, the following evaluation methodology was used. Select an account A and construct its model over some random activity hour. Sample 500 event sequences of A and compute their mean anomaly score, which is denoted here by mu-A. Next sample an additional 500 sequences over the same hour but of a different account B, and compute their mean anomaly score, which is denoted here by mu-N. One expects B's event sequences' mean anomaly score to be larger than A's, as B's sequences are presumably anomalous with regard to A. Repeat such evaluation to conduct additional experiments for different accounts, times, and dates. Having followed this methodology, in 92% of the cases the mean anomaly score of Account B was larger than A's as expected. Paired t-test confirmed that the results are statistically significant.

Some More Usage Scenarios. Two possible utilization categories of a sequence anomaly algorithm as taught herein are detection and investigation. The detection scenarios detect suspicious sessions by setting a threshold 1020 on the anomaly score 414 and alerting 914 on highly anomalous sequences. Computing 1108 anomaly scores exhaustively over all event sequences is most likely too costly and hence is not always desired. An alternative is to trigger 1216 the sequence anomaly detector 408 upon an alert raised by a cheaper, coarse-grained detector 420, which has more false positives. The sequence anomaly algorithm is then used for pin-pointing suspicious sequences that were performed in a close proximity to the alert's time.

In some experimentation, sequence anomaly-based investigation was combined with a coarse-grained data exfiltration detector 420. Data exfiltration tools seek to detect reads of large amounts of data that deviate from an expectation, but may provide little or no basis for detailed insights into suspicious events. Confidential experiments explored some interesting scenarios, including three examples discussed here. In one case, a system 400 detected tens of extremely anomalous reads of large data volumes of sensitive data. In a second case, a system 400 detected anomalous reads of tens of blobs accompanied with access errors. The detections accomplished in these two cases likely indicate malicious activity. In a third case, a system 400 found event sequences having a low anomaly score that did not involve read operations, accompanied by repeated erroneous container accesses that were scored anomalous. This third scenario is not likely to indicate a malicious activity, rather is likely due to some application error. These examples demonstrate how sequence anomaly according to teachings presented herein assists security experts 1024 in drilling down into the event sequence data in order to further investigate alert scenarios.

More generally, sequence anomaly algorithms taught herein may be beneficially utilized to enhance cybersecurity in domains beyond cloud storage. Also, one of skill may apply these teachings to utilize an algorithm in a stream-based version which dynamically updates an account's model at runtime.

More About Sessions

Additional illustrations of sequences that approximate sessions are provided below.

In some embodiments, a sequence 410 represents an entity's consecutive events for a period of time. Heuristics 502 can be applied to separate sessions by using idle time and the number of events as delimiters 1222. For example, in some embodiments the 10 minute gap shown below as a comment would result in recognition 502 of two event sequences, before and after the gap respectively, instead of a single sequence containing all the events shown:

12:04, Acquire Lease
12:05, Get Props, auth, success
12:06, List Blobs
12:08, read, 4K, success
12:09, read, 4K, success
12:10, write, 2K, success
--10 mins idle time--
13:20, Get Props, success
13:21, read, 2K, success
13:22, read, 2K, success
13:23, read, 2K, success
13:24, List Blobs Assume these sequences are then used to learn this account's model 402. Then other sequences could be submitted 1206 to the trained model as candidate sequences to obtain predictions, that is, to obtain anomaly scores.

As a first candidate, the following could be submitted:
19:21, read, 2K, success
19:22, read, 2K, success
19:23, read, 4K, success
19:24, List Blobs This would produce a score indicating that the submitted sequence is not an anomaly; it is considered OK in relation to the account's model.

As a second candidate, the following could be submitted:
20:21, Get Props, error
20:22, Get Props, error
20:23, Get Props, success
20:24, read, 1G This would produce a score indicating that the submitted sequence is an anomaly; it is considered not OK in relation to the account's model. Intuitively, the first candidate sequence resembles the training sequences much more closely than the second sequence does.

However, anomaly detection tools 122, 400 do not need to rely on labor-intensive human intuition, which is relatively very slow and very financially expensive, and is subject to inconsistency errors, exhaustion errors, insider corruption errors, and breaks in coverage due to vacation time or illness. Instead, automated systems 400 as taught herein can be used to replace such reliance on intuition, or at least to allow the application of human effort where it will be most efficient, e.g., in the interpretation of alerts and contexts from multiple automated sources and in combination with threat intelligence such as knowledge of which bad actors are frequently involved in attacks against a particular environment and what tactics, techniques, and procedures are favored by those bad actors.

More About Anomaly Prediction

Some embodiments, when given a new sequence approximating a session, return an anomaly score in [0,1] (also referred to as "[0 . . . 1]", meaning real numbers from and including zero up to and including one). The larger the score 414 is, the more likely a sequence is anomalous.

As to anomaly computation scope, some embodiments in some circumstances compute 1108 an anomaly score with respect to all of an account's history, e.g., all events recorded for a particular storage account, which may include events involving multiple human users and their respective accounts. Sometimes the computation scope includes the history 416 of a subset of related entities, e.g., a restriction condition 418 may be imposed, limiting computation scope to events 204 having the same IP address, same agent, same agent and IP address, and so on.

As additional illustrations, consider the following data exfiltration and sequence anomaly scenarios. Their setting includes a history model of some account, for a particular period such as 24 hours (or sometimes more, or less). Assume a data exfiltration alert from another tool identifies a suspicious entity <IP, agent> at some hour. The sequence anomaly detection tool computes the suspicious entity's sessions anomaly score 414. The tool or an analyst may note the suspicious hour and then prompt or dive into corresponding sessions in the log 302.

As to a timeline, assume that on 8/12 at 22:00 the tool constructed a model 402 using ~2k session approximations (i.e., extracted event sequences). Assume there is no suspicious activity for a month. Then on 9/12 at 13:00, which is a suspicious time, the data exfiltration alert occurs. In this context, the model 402 is not up-to-date as of 9/12, but may be useful nonetheless. In alternative embodiments, models are updated at regular intervals, e.g., each week.

One scenario involved extremely anomalous reads of multiple blobs. Anomaly statistics information gained by algorithm execution, based on suitably protected real world data, counted 653 suspicious sessions within an hour, including extremely abnormal session approximations which have an anomaly score of 1. An investigation dive into the log by a human analyst in response to these anomaly statistics revealed sequences containing only reads, e.g., GetBlob, GetBlob, GetBlob, and so on. These included many reads of different blobs, with some of the blob names hinting at personal or otherwise sensitive data, such as:
/userdoc/car-image.jpg
/userdoc/policies/Tax-Invoice.pdf
/userdoc/policies/debit note.pdf
/userdoc/motor/driving-license.jpg
/userdoc/motor/insurance-company.svg This activity was probably malicious. That is, the reads likely indicate a compromise of system 130 security.

Another scenario involved multiple reads of different blobs, and errors. In this case, anomaly statistics showed 18 session approximations, including abnormal session approximations, with all sessions having a high anomaly score in the range from 0.4 to 0.8. An investigator 1024 dive into the log revealed reads of 187 distinct jpg files with many ContainerNotFound errors, including 260 failures accessing the same container. Reads targeted items 210 such as these:
/path/uploads-users-3949.jpg
/path/uploads-users-1929.jpg
/path/uploads-users-9309.jpg
/path/uploads-media-3020.jpg A repeating error occurred: /path/uploads/users ContainerNotFound. This name was very similar to an existing container's name:
/path1/path2/path3/versus/path1/path2-path3/

This activity was probably a result of a programming error.

Another scenario involved multiple reads of the same blob. In this case, anomaly statistics showed 66 session approximations, with both normal and abnormal sessions, with 25% of the top anomaly scores in the range 0.4 to 0.5. An investigator 1024 dive into the log revealed a repeating read:
/path/someblob
/path/someblob
/path/someblob
/path/someblob Activity also included additional operations without read, e.g., PutPage, PutPage, PutPage, and so on. Anomalous sessions were particularly suspect because they involved reads of the same blob, whereas normal sessions don't involve reads.

This could be a programming error, or an indicator of compromise.

Another scenario involved a single read of a large blob. Anomaly statistics showed 32 session approximations total, with a single abnormal session whose anomaly score was quite high: 0.77. An investigator 1024 dive into the log revealed that the abnormal session included a failure to access /path/some_container, a success to access/path/another_container, and then a read/path/gigas_blob. All other sessions resembled PutBlob, PutBlob, PutBlob, and so on. The abnormal session's failure to access container (ContainerNotFound) was from a single read of a large blob (gigabytes in size).

Normal sessions in this context don't involve reads, so this session probably reflects malicious activity.

Some Additional Combinations and Variations

Any of these combinations of code, data structures, logic, components, communications, and/or their functional equivalents may also be combined with any of the systems and their variations described above. A process may include any steps described herein in any subset or combination or sequence which is operable. Each variant may occur alone, or in combination with any one or more of the other variants. Each variant may occur with any of the processes and each process may be combined with any one or more of the other processes. Each process or combination of processes, including variants, may be combined with any of the configured storage medium combinations and variants describe above.

CONCLUSION

In short, the teachings provided herein may be applied to enhance cybersecurity of a computing system. Anomalous sequences 410, 406 are detected 1238, and behavior analysis can be performed, even without user identification 512 or session identifiers 526, by approximating 1242 user sessions 506 with heuristically extracted 502 event sequences 410. Extraction delimiters 1222 may include event count 514 or event timing 516 constraints. Event sequences 410 extracted from logs 302 or other event lists 216 are vectorized 800 and embedded 1106 in a vector space 810. A machine learning model 402 similarity function 432 measures anomalousness of a candidate sequence 410 relative to a specified history 416, thus computing 1108 an anomaly score 414. Restrictions 418 may be placed on the history 416 to focus on a particular IP address or time frame, without retraining the model 402. Anomalous sequences 410, 406 may generate alerts 914, prompt 906 investigations by security personnel 1024, trigger automatic mitigation 908, trigger automatic acceptance 918, trigger tool configuration 904 actions, or result in other cybersecurity actions 900.

Embodiments are understood to also include or benefit from tested and appropriate security controls and privacy controls, e.g., it is understood that appropriate measures should be taken to help prevent misuse of the event set and help avoid tampering with the behavior analysis. Use of the tools and techniques taught herein is compatible with use of such controls.

Although particular embodiments are expressly illustrated and described herein as processes, as configured storage media, or as systems, it will be appreciated that discussion of one type of embodiment also generally extends to other embodiment types. For instance, the descriptions of processes in connection with FIGS. 11 and 12 also help describe configured storage media, and help describe the technical effects and operation of systems and manufactures like those discussed in connection with other Figures. It does not follow that limitations from one embodiment are necessarily read into another. In particular, processes are not necessarily limited to the data structures and arrangements presented while discussing systems or manufactures such as configured memories.

One of skill will understand that sequence anomalousness can be scored according to teachings provided herein, in many situations. In particular, the number of user accounts involved, a simplifying assumption that users correspond 1-to-1 with user accounts, the time periods used, the specific functions used by scoring algorithms, the exclusion or inclusion filters used to focus algorithm data processing, and other specifics of the examples discussed above or elsewhere herein are merely illustrative. They do not limit the scope of the teachings presented or the variety of embodiments that are consistent with those teachings.

Those of skill will understand that implementation details may pertain to specific code, such as specific APIs, specific fields, specific kinds of components, and specific sample programs, and thus need not appear in every embodiment. Those of skill will also understand that program identifiers and some other terminology used in discussing details are implementation-specific and thus need not pertain to every embodiment. Nonetheless, although they are not necessarily required to be present here, such details may help some readers by providing context and/or may illustrate a few of the many possible implementations of the technology discussed herein.

Reference herein to an embodiment having some feature X and reference elsewhere herein to an embodiment having some feature Y does not exclude from this disclosure embodiments which have both feature X and feature Y, unless such exclusion is expressly stated herein. All possible negative claim limitations are within the scope of this disclosure, in the sense that any feature which is stated to be part of an embodiment may also be expressly removed from inclusion in another embodiment, even if that specific exclusion is not given in any example herein. The term "embodiment" is merely used herein as a more convenient form of "process, system, article of manufacture, configured computer readable storage medium, and/or other example of the teachings herein as applied in a manner consistent with applicable law." Accordingly, a given "embodiment" may include any combination of features disclosed herein, provided the embodiment is consistent with at least one claim.

Not every item shown in the Figures need be present in every embodiment. Conversely, an embodiment may contain item(s) not shown expressly in the Figures. Although some possibilities are illustrated here in text and drawings by specific examples, embodiments may depart from these examples. For instance, specific technical effects or technical features of an example may be omitted, renamed, grouped differently, repeated, instantiated in hardware and/or software differently, or be a mix of effects or features appearing in two or more of the examples. Functionality shown at one location may also be provided at a different location in some embodiments; one of skill recognizes that functionality modules can be defined in various ways in a given implementation without necessarily omitting desired technical effects from the collection of interacting modules viewed as a whole. Distinct steps may be shown together in a single box in the Figures, due to space limitations or for convenience, but nonetheless be separately performable, e.g., one may be performed without the other in a given performance of a method.

Reference has been made to the figures throughout by reference numerals. Any apparent inconsistencies in the phrasing associated with a given reference numeral, in the figures or in the text, should be understood as simply broadening the scope of what is referenced by that numeral. Different instances of a given reference numeral may refer to different embodiments, even though the same reference numeral is used. Similarly, a given reference numeral may be used to refer to a verb, a noun, and/or to corresponding instances of each, e.g., a processor 110 may process 110 instructions by executing them.

As used herein, terms such as "a" and "the" are inclusive of one or more of the indicated item or step. In particular, in the claims a reference to an item generally means at least one such item is present and a reference to a step means at least one instance of the step is performed.

Headings are for convenience only; information on a given topic may be found outside the section whose heading indicates that topic.

All claims and the abstract, as filed, are part of the specification.

To the extent any term used herein implicates or otherwise refers to an industry standard, and to the extent that applicable law requires identification of a particular version of such as standard, this disclosure shall be understood to refer to the most recent version of that standard which has been published in at least draft form (final form takes precedence if more recent) as of the earliest priority date of the present disclosure under applicable patent law.

While exemplary embodiments have been shown in the drawings and described above, it will be apparent to those of ordinary skill in the art that numerous modifications can be made without departing from the principles and concepts set forth in the claims, and that such modifications need not encompass an entire abstract concept. Although the subject matter is described in language specific to structural features and/or procedural acts, it is to be understood that the subject matter defined in the appended claims is not necessarily limited to the specific technical features or acts described above the claims. It is not necessary for every means or aspect or technical effect identified in a given definition or example to be present or to be utilized in every embodiment. Rather, the specific features and acts and effects described are disclosed as examples for consideration when implementing the claims.

All changes which fall short of enveloping an entire abstract idea but come within the meaning and range of equivalency of the claims are to be embraced within their scope to the full extent permitted by law.

What is claimed is:

1. A cybersecurity system, comprising:
a processor;
a memory in operable communication with the processor; and
a sequence anomalies detection code which upon execution with the processor performs operations that include (a) obtaining a list of events from an event listing source, (b) heuristically extracting an ordered event sequence from the list of events as a user session candidate without reliance on user identity data, (c) producing a candidate vector by vectorizing the extracted ordered event sequence, (d) submitting the candidate vector to a trained machine learning model which computes an anomaly score for the candidate vector, wherein the machine learning model measures anomalousness using previously vectorized ordered event sequences which collectively represent a history of guarded computing system events, (e) receiving the computed anomaly score, and (f) utilizing the computed anomaly score to enhance cybersecurity of the guarded computing system.

2. The system of claim 1, wherein the sequence anomalies detection code comprises a max-events-per-sequence limit which is at least three, and also comprises heuristic sequence extraction code which upon execution extracts the ordered event sequence by (a) selecting at least one anchor event from the list of events, and (b) selecting zero or more additional events from the list of events up to a total number of no more than max-events-per-sequence selected events.

3. The system of claim 1, wherein the sequence anomalies detection code comprises a max-time-between-events limit which is in a range from one nanosecond to ten minutes, and also comprises heuristic sequence extraction code which upon execution extracts the ordered event sequence by (a) selecting an anchor event from the list of events, and (b) selecting additional events from the list of events, each selected event having an associated timestamp, where the difference between timestamps of any two consecutive selected events when the selected events are ordered by timestamp value is no more than max-time-between-events.

4. The system of claim 1, further comprising a coarse detector having precursor detection code which upon execution detects a precursor condition in a list of events from the event listing source, and wherein the system is configured such that the coarse detector triggers execution of the sequence anomalies detection code.

5. The system of claim 1, further comprising a dynamic restriction code which upon execution gets a restriction condition which is satisfied by a proper subset of the history of guarded computing system events, and wherein the trained machine learning model upon execution computes the anomaly score for the candidate vector without using previously vectorized ordered event sequences outside the proper subset.

6. The system of claim 1, further comprising the trained machine learning model which upon execution computes the anomaly score for the candidate vector using previously vectorized ordered event sequences, wherein the learning model was trained using one or more ordered event sequences whose length as text differs from a length of the extracted ordered event sequence as text.

7. A cybersecurity method, comprising:
acquiring a candidate event sequence to be tested for anomalousness, events in the candidate event sequence representing occurrences or states or both in a guarded computing system (GCS);
vectorizing the candidate event sequence at least in part by embedding the candidate event sequence in a vector space, thereby producing a candidate vector, the vectorizing being independent of any association of user account identification with events of the candidate event sequence;
computing an anomaly score for the candidate vector, without relying on user identity information, using a machine learning model which was trained with previously vectorized event sequences which collectively represent a history of events in the guarded computing system; and
utilizing the computed anomaly score of the candidate vector by performing at least one of the following cybersecurity operations based at least in part on the computed anomaly score:
configuring an intrusion detection tool to detect guarded computing system intrusion,
configuring an intrusion prevention tool to prevent guarded computing system intrusion,
configuring an administrative interface to facilitate administration of the guarded computing system,
configuring a data loss prevention tool to prevent data loss from the guarded computing system,
configuring a security information and event management tool which monitors the guarded computing system,
configuring a cybersecurity tool which generates alerts about the guarded computing system based at least in part on anomaly scores, or
prompting an investigation of the guarded computing system by a security analyst or other human security personnel or an automated security investigator.

8. The method of claim 7, wherein acquiring a candidate event sequence comprises heuristically extracting the candidate event sequence from a list of events, wherein heuristically extracting the candidate event sequence comprises delimiting the candidate event sequence, and wherein delimiting the candidate event sequence is based on at least one of the following sequence delimiting parameters:
a limit on the maximum number of events allowed in the candidate event sequence, or
a limit on the maximum time allowed between any two consecutive events in the candidate event sequence, or a limit on the maximum time allowed between an earliest event in the candidate event sequence and a latest event in the candidate event sequence.

9. The method of claim 7, wherein vectorizing the candidate event sequence comprises:
transforming the candidate event sequence into a single piece of text; and
performing on the single piece of text an algorithm that learns fixed-length feature representations from variable-length pieces of text.

10. The method of claim 7, further comprising:
getting a restriction condition;
restricting the history based on the restriction condition, thereby defining a restricted history;
computing a focused anomaly score for the candidate vector, while using from the history only the restricted history portion of the history; and
utilizing the focused anomaly score of the candidate vector by performing one or more cybersecurity operations.

11. The method of claim 10, wherein the restricting comprises restricting the history to meet at least one of the following restriction conditions:
all events in any sequence represented in the restricted history originated from the same IP address;
all events in any sequence represented in the restricted history originated from the same IP address range;
all events in any sequence represented in the restricted history originated from the same application program;
all events in any sequence represented in the restricted history originated from the same application program interface;
all events in any sequence represented in the restricted history originated from the same device; or
all events in any sequence represented in the restricted history originated from the same service.

12. The method of claim 7, wherein computing an anomaly score for the candidate vector comprises using at least one of the following:
a k nearest neighbors calculation;
an isolation forest calculation; or
a local outlier factor calculation.

13. The method of claim 7, further comprising at least one of the following:
training the machine learning model using vectorized event sequences without using any association of particular event sequences with particular user accounts; or
training the machine learning model using vectorized event sequences without using logged session ids.

14. The method of claim 7, further comprising avoiding associating particular event sequences with particular user accounts, based on at least one of the following conditions: presence of a privacy policy, a lack of user account identification at a location where events are logged, a lack of logged session ids.

15. The method of claim 7, wherein acquiring the candidate event sequence to be tested for anomalousness comprises acquiring a set of storage service requests which do not associate user information with each request.

16. A storage medium configured with code which upon execution by one or more processors performs a cybersecurity method, the method comprising:
obtaining a list of events from an event listing source, events in the list representing occurrences or states or both in a guarded computing system (GCS);
heuristically extracting a candidate event sequence from the list of events;
vectorizing the candidate event sequence at least in part by embedding the candidate event sequence in a vector space, thereby producing a candidate vector;
computing an anomaly score for the candidate vector, without relying on user identity information, using a machine learning model and also using vectorized event sequences which collectively represent a history of events in the guarded computing system; and
submitting the computed anomaly score of the candidate vector for utilization by at least one of the following cybersecurity operations:
configuring an intrusion detection tool to detect guarded computing system intrusion,
configuring an intrusion prevention tool to prevent guarded computing system intrusion,
configuring an administrative interface to facilitate guarded computing system administration,
configuring a data loss prevention tool to prevent data loss from the guarded computing system,
configuring a security information and event management tool which monitors the guarded computing system,
configuring a cybersecurity tool which generates alerts about the guarded computing system based at least in part on anomaly scores, or
prompting an investigation of the guarded computing system by a security analyst or another human or automated security investigator.

17. The storage medium of claim 16, wherein the method further comprises:
getting a restriction condition;
restricting the history based on the restriction condition, thereby defining a restricted history;
computing a focused anomaly score for the candidate vector, while using from the history only the restricted history portion of the history, without retraining the machine learning model; and
submitting the focused anomaly score for utilization by one or more cybersecurity operations.

18. The storage medium of claim 16, wherein heuristically extracting the candidate event sequence comprises enforcing at least one of the following sequence delimiting parameters:
a limit on the maximum number of events allowed in the candidate event sequence, said limit in the range from three to one hundred events,
a limit on the maximum time allowed between any two consecutive events in the candidate event sequence, said limit in the range from one millisecond to five minutes, or
a limit on the maximum time allowed between an earliest event in the candidate event sequence and a latest event in the candidate event sequence is in the range from three seconds to three minutes.

19. The storage medium of claim 16, wherein the method further comprises classifying the candidate event sequence as an anomaly based at least in part on the computed anomaly score, and wherein the candidate event sequence includes at least one of the following:
a sequence containing at least five read attempts or reads of one or more storage items, wherein the storage items contain one or more of the following: personally identifiable information, protected health information, financial information, governmentally regulated information, information which has been governmentally classified to restrict access, or restricted access intellectual property; or a sequence containing at least ten failed attempts to read one or more storage items.

20. The storage medium of claim 16, wherein obtaining the list of events is triggered by a communication from a coarser-grained security tool, or includes obtaining the list of events from the coarser-grained security tool, or both.

* * * * *